US009577829B1

(12) United States Patent
Roth et al.

(10) Patent No.: US 9,577,829 B1
(45) Date of Patent: Feb. 21, 2017

(54) MULTI-PARTY COMPUTATION SERVICES

(71) Applicant: Amazon Technologies, Inc., Reno, NV (US)

(72) Inventors: Gregory Branchek Roth, Seattle, WA (US); Aaron Douglas Dokey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/476,635

(22) Filed: Sep. 3, 2014

(51) Int. Cl.
| G06F 21/00 | (2013.01) |
| H04L 9/32 | (2006.01) |
| G06F 21/60 | (2013.01) |
| G06F 21/53 | (2013.01) |
| G06F 21/57 | (2013.01) |
| G06F 21/62 | (2013.01) |

(52) U.S. Cl.
CPC ............... H04L 9/32 (2013.01); G06F 21/60 (2013.01); G06F 21/53 (2013.01); G06F 21/57 (2013.01); G06F 21/6218 (2013.01)

(58) Field of Classification Search
CPC ...... G06F 21/57; G06F 21/53; G06F 21/6218; G06F 21/31; G06F 21/60; H04L 63/20; H04L 2463/102; H04L 63/10; H04L 9/3247; H04L 9/0861; H04L 63/04; H04L 9/3218; H04L 9/0838; H04L 9/32
USPC ......................................................... 713/164
See application file for complete search history.

(56) References Cited

U.S. PATENT DOCUMENTS

| 4,218,582 | A | 8/1980 | Hellman et al. |
| 4,405,829 | A | 9/1983 | Rivest et al. |
| 5,643,085 | A | 7/1997 | Aityan et al. |
| 5,643,086 | A | 7/1997 | Alcorn et al. |
| 5,666,533 | A | 9/1997 | Horiguchi et al. |
| 5,848,159 | A | 12/1998 | Collins et al. |
| 5,867,578 | A | 2/1999 | Brickell et al. |
| 5,905,799 | A | 5/1999 | Ganesan |
| 6,071,190 | A | 6/2000 | Weiss et al. |
| 6,237,097 | B1 | 5/2001 | Frankel et al. |
| 6,364,796 | B1 | 4/2002 | Nakamura et al. |
| 6,631,354 | B1 | 10/2003 | Leymann et al. |
| 6,722,986 | B1 | 4/2004 | Lyons et al. |

(Continued)

FOREIGN PATENT DOCUMENTS

WO    2008118648 A1    10/2008

OTHER PUBLICATIONS

O. Goldreich, S. Micali, and A. Wigderson. 1987. How to play ANY mental game. In Proceedings of the nineteenth annual ACM symposium on Theory of computing (STOC '87), Alfred V. Aho (Ed.). ACM, New York, NY, USA, 218-229.*

(Continued)

Primary Examiner — Alexander Lagor
(74) Attorney, Agent, or Firm — Davis Wright Tremaine LLP

(57) ABSTRACT

A system and method of performing a multi-party computation by determining a function for use in the multi-party computation, receiving a plurality of input values for the function, evaluating the function based at least in part on the plurality of input values to generate a result wherein the result is not usable to determine an input of the plurality of input values, and providing an output based at least in part on the result.

23 Claims, 11 Drawing Sheets

(56) References Cited

U.S. PATENT DOCUMENTS

| | | | |
|---|---|---|---|
| 6,834,272 B1 * | 12/2004 | Naor | G06Q 20/0855 380/255 |
| 7,063,615 B2 | 6/2006 | Alcorn et al. | |
| 7,917,747 B2 | 3/2011 | Wolf | |
| 8,291,468 B1 | 10/2012 | Chickering | |
| 8,407,584 B1 | 3/2013 | Boodman et al. | |
| 8,473,754 B2 | 6/2013 | Jones et al. | |
| 9,116,733 B2 | 8/2015 | Banga et al. | |
| 9,154,479 B1 | 10/2015 | Sethi | |
| 9,246,690 B1 | 1/2016 | Roth et al. | |
| 2002/0184046 A1 | 12/2002 | Kamada et al. | |
| 2004/0176068 A1 | 9/2004 | Paatero | |
| 2005/0091535 A1 | 4/2005 | Kavalam et al. | |
| 2005/0278418 A1 | 12/2005 | Rathakrishnan et al. | |
| 2006/0161887 A1 | 7/2006 | Krishnaswamy et al. | |
| 2007/0050763 A1 | 3/2007 | Kagan et al. | |
| 2007/0153715 A1 | 7/2007 | Covington et al. | |
| 2007/0206799 A1 | 9/2007 | Wingert et al. | |
| 2008/0216071 A1 | 9/2008 | Gidalov | |
| 2009/0112359 A1 | 4/2009 | Sanguinetti | |
| 2009/0313406 A1 | 12/2009 | Suh et al. | |
| 2010/0031325 A1 | 2/2010 | Maigne et al. | |
| 2010/0077473 A1 | 3/2010 | Ohta et al. | |
| 2012/0084838 A1 | 4/2012 | Inforzato et al. | |
| 2012/0144457 A1 | 6/2012 | Counterman | |
| 2012/0159184 A1 | 6/2012 | Johnson et al. | |
| 2012/0192177 A1 | 7/2012 | Tsirkin | |
| 2013/0007239 A1 | 1/2013 | Agarwal et al. | |
| 2013/0117561 A1 | 5/2013 | Chawla et al. | |
| 2013/0151846 A1 | 6/2013 | Baumann et al. | |
| 2013/0174150 A1 | 7/2013 | Nakajima | |
| 2013/0174151 A1 | 7/2013 | Nakajima | |
| 2013/0179682 A1 | 7/2013 | Ramachandran et al. | |
| 2013/0198853 A1 | 8/2013 | McKeen et al. | |
| 2013/0227286 A1 | 8/2013 | Brisson | |
| 2013/0246778 A1 | 9/2013 | Nikara et al. | |
| 2013/0282776 A1 | 10/2013 | Durrant et al. | |
| 2013/0312117 A1 | 11/2013 | Sapp, II et al. | |
| 2013/0318343 A1 | 11/2013 | Bjarnason et al. | |
| 2013/0326504 A1 | 12/2013 | Tsirkin et al. | |
| 2014/0075496 A1 | 3/2014 | Prakash et al. | |
| 2014/0105393 A1 * | 4/2014 | Kolesnikov | H04L 9/3218 380/255 |
| 2014/0181359 A1 | 6/2014 | Zhang et al. | |
| 2014/0201841 A1 | 7/2014 | Deshpande et al. | |
| 2014/0223543 A1 | 8/2014 | Jeansonne et al. | |
| 2014/0282935 A1 | 9/2014 | Lal et al. | |
| 2014/0283098 A1 | 9/2014 | Phegade et al. | |
| 2014/0317686 A1 | 10/2014 | Vetillard | |
| 2014/0325515 A1 | 10/2014 | Salmela et al. | |
| 2014/0331317 A1 | 11/2014 | Singh | |
| 2014/0351583 A1 | 11/2014 | Bettale et al. | |
| 2014/0373012 A1 | 12/2014 | Ylitalo et al. | |
| 2015/0007175 A1 | 1/2015 | Potlapally et al. | |
| 2015/0058629 A1 | 2/2015 | Yarvis et al. | |
| 2015/0127834 A1 | 5/2015 | Udupi et al. | |
| 2015/0143347 A1 | 5/2015 | Jones et al. | |
| 2015/0143374 A1 | 5/2015 | Banga et al. | |
| 2015/0143375 A1 | 5/2015 | Bruso et al. | |
| 2015/0199509 A1 | 7/2015 | Wille | |
| 2015/0200948 A1 | 7/2015 | Cairns et al. | |
| 2015/0244716 A1 | 8/2015 | Potlapally et al. | |
| 2015/0254451 A1 | 9/2015 | Doane et al. | |
| 2015/0278528 A1 | 10/2015 | Xing et al. | |
| 2016/0088009 A1 | 3/2016 | Gupta et al. | |

OTHER PUBLICATIONS

McKeen, Frank et al., "Innovative Instructions and Software Model for Isolated Execution", pp. 1-8, Intel Corporation, 2013.

Intel SGX for Dummies—Part 1 (Intel SGX Design Objectives), pp. 1-4, Sep. 26, 2013, Intel Corporation.

Intel SGX for Dummies—Part 2, pp. 1-3, Jun. 2, 2014, Intel Corporation.

Intel SGX for Dummies—Part 3, pp. 1-3, Sep. 1, 2014, Intel Corporation.

Software Guard Extensions Programming Reference, 2010-2013, Intel Corporation.

* cited by examiner

MULTI-PARTY COMPUTATION SERVICES

BACKGROUND

Multi-party computation is a field of cryptographic research with a goal to allow multiple mutually-distrustful parties to compute a function while simultaneously keeping the input values private. The aim of multi-party computation is to enable the design of systems with the best balance of utility and user privacy without the use of a trusted third party. However, current protocols are more time-consuming than performing the computation using trusted third parties and require costly computer hardware.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include providing multi-party computation as a web service to customers of a computing resource service provider. In some embodiments, the computing resource service provider operates as a trusted third party for the multi-party computation. In other embodiments, a secure execution environment (such as an enclave) is instantiated to perform the multi-party computation, providing benefits of increased isolation to reduce the likelihood of compromise, allowing components to run on the same host with a benefit to improved speed and efficiency, and assurance that the components running in the enclave are valid. In some embodiments, the computing resource service provider further provides a multiple execution instance environment comprising one or more compute nodes, each of which being operable to receive a portion of the input values and operable to compute a multi-party computation function without sharing the input values with other individual components.

The computing resource service provider may provide an application programming interface to the customers to define and evaluate various multi-party computation functions. For example, an application programming interface library may include functionality allowing users to be able to define functions usable in a multi-party computation, adding functions to a multi-party computation function library, requesting an attestation as to a multi-party computation function being computed, providing input to the multi-party computation function, evaluating the multi-party computation function once input values have been received, destroying the input values to the multi-party computation functions, and requesting the output of the multi-party computation function. In some embodiments, a service, such as a web service, provides customers with the application programming interface for performing multi-party computations, and, in other embodiments, customers may perform multi-party computations by directly communicating with one or more servers or virtual machine instances, such as via a network address.

Figure 1:
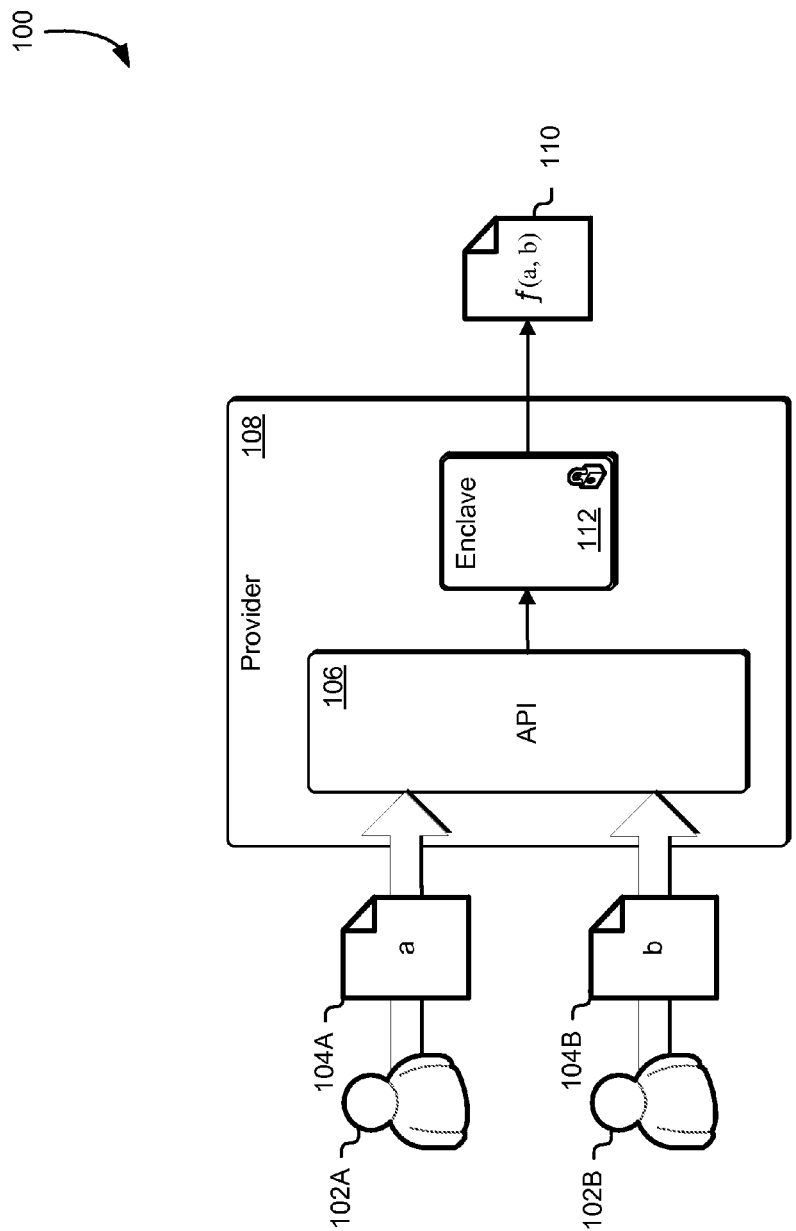
FIG. 1 illustrates an example of a service for providing multi-party computation in accordance with an embodiment.

FIG. 1 illustrates an aspect of an environment 100 in which an embodiment may be practiced. The illustration of FIG. 1 depicts an example multi-party computation where two parties, 102A and 102B, provide their respective input values, 104A and 104B, to an application programming interface 106 of a computing resource service provider 108 to yield an output 110 of a function performed on the input values 104A and 104B. In some embodiments, as depicted in the environment 100, components (e.g., multiple functions or sub-functions from which an overall function may be composited) of the multi-party computation are evaluated in an enclave 112, but in other embodiments the enclave 112 may not be present and the components of the multi-party computation may be evaluated in an environment under the control of the computing resource service provider where the computing resource service provider is acting as a trusted third party.

The parties 102A and 102B represent mutually-distrustful parties who are seeking to perform a computation without revealing their respective input values 104A and 104B to the other. Neither of the parties 102A and 102B need be individuals, but one or all may be some other type of entity, such as an application, system, service, or resource. Furthermore, although FIG. 1 depicts two parties, it is contemplated that any number of parties is within the scope of the present disclosure and that functions may be configured to accept a number of input values accordingly. In the embodiment depicted as environment 100, the parties 102A and 102B seek to obtain a result from a function defined as $f(a, b)$. Note that the function may be any type of function that evaluates one or more input values to yield one or more results, such as, for example, a series of executable instructions coded in a high-level scripting language.

In some cases, the function may have been mutually agreed-upon and provided by the parties 102A and 102B, or, in other cases, the function may have been mutually agreed-upon and selected from a function library provided by the computing resource service provider 108. In some cases, the function may be provided or selection made through a graphical user interface provided by the computing resource service provider 108, while in other cases the function may be provided or selection made programmatically by a third party, such as either of the parties 102A and 102B. Once the function is provided or selected, in some cases the computing resource service provider 108 may respond with a measurement of the function, such as a hash of the executable function code, usable to attest in the future that the code of the function has not been tampered with.

The function ƒ(a, b) represents any computation that may be evaluated at least partially utilizing a or b. As an example, ƒ(a, b) may apply a logical operation is Equal(a, b) to yield a Boolean result of true or false. Note that the values of a and b need not be limited to integers, numeric, or individual values. For example, party 102A may supply values of $a_0=12$ and $a_1=55$, and party 102B may supply values of $b_0=43$ and $b_1=-72$ and ƒ(a, b) may be configured to provide a mean (or other statistical calculation) of all input values, ƒ($a_0$, $a_1$, $b_0$, $b_1$)=19. Another example may be that the function ƒ(a, b) could be configured to calculate a sha256 hash of a concatenation of two strings, a="Now is the time" and b="for all good men," yielding "579c08ee78 ce5bce40f273f7c35dfdf2f0615e026991c840ea1e16b367fc0 f63." The variables a and b may also be multi-dimensional vectors, as another example.

The function ƒ(a, b) having been designated, the parties 102A and 102B may provide their respective input values 104A and 104B to the function by making a call to the application programming interface 106, such as through a web service, and passing their value to the input of the function (e.g., "call provideInput(function_ID, input_ID, input_value)," where function_id indicates the function being evaluated, input_ID indicating which input value is being passed, and input_value being the value of the input). The application programming interface 106 call may be made by each party independently, and the application programming interface 106 may stage the input values in the enclave 112.

The enclave 112 is a protected area in memory address space of a computer system that provides confidentiality and integrity for applications and data within the protected area. The enclave 112 operates as a secure execution environment; that is, the enclave 112 prevents applications external to the enclave 112, even privileged applications such as virtualization monitors, basic input/output systems, operating systems, and even other enclaves, from accessing the enclave 112 memory address space, but applications executing within the enclave 112 may access executable instructions and data internal to the enclave 112. The enclave 112 prevents access to unencrypted enclave data (i.e., data resident within the enclave 112) by applications external to the enclave 112, and, when the data is written to the memory address space, the data is automatically encrypted. Additionally, information exiting the enclave 112 may be cleansed of data referring to protected memory addresses of the enclave 112 to prevent external software from determining the location of enclave-protected data in memory.

In some embodiments, an enclave is configured using dedicated hardware that may implement a variety of security assurance methods including microcode instructions on a central processing unit, and a trusted platform module. When an enclave is created, the creator of the enclave may receive an access key through which access to the enclave is controlled, and any entity without proper credentials may be prevented from accessing confidential data and/or applications configured to access the confidential data by storing the data and/or applications in the enclave.

Enclave functionality may be provided to a system through software, such as under the control of a hypervisor or a kernel of an operating system that allows virtualized user space instances, or through hardware by a specialized instruction set, such as Intel® Software Guard eXtensions, a module such as a trusted platform module, system microcode or combinations of these. Enclave functionality allows programmatic instantiation of the enclave 112, which may comprise initializing of an enclave control structure, allocating enclave memory, loading of enclave contents (e.g., applications and/or data loaded into the enclave 112) into the enclave 112 memory, measuring of the enclave 112 contents, and establishing an enclave 112 identity. Enclave functionality may also include the ability to protect applications and/or data within the enclave 112 from malicious software attacks, by detecting integrity violations of protected applications and/or data and preventing access to protected applications and/or data that fail integrity checks.

A characteristic of the enclave 112 is an ability to provide remote attestation as to the state of the enclave 112. For example, the enclave 112 may have a set of functions that, when executed by a processor, provide a measurement indicating the current state of executable code and/or data within the enclave 112. Another characteristic of the enclave 112 is that it has a root of trust separate and protected from outside entities. That is, the enclave 112 may have cryptographic keys resident within the enclave 112 for digitally signing data output from the enclave 112, and, by verifying the digital signature, applications external to the enclave 112 may be configured to trust the output data.

Enclave functionality may include functionality for creating, deprovisioning, measuring (i.e., gathering metrics from) and populating enclaves. Enclave functionality may further include generating keys, providing data and receiving data. Access to such enclave functionality may be provided by a code library, an interface, web service and/or an application programming interface. In response to receiving a request through one of the methods of accessing enclave functionality, the computing resource service provider may provide that access to a user of a computer system. Note that the providers of enclave functionality, the types of enclave functionality, and the methods of providing access to enclave functionality described are for illustrative purposes and, as such, other providers of enclave functionality, types of enclave functionality and methods of providing access to enclave functionality as would be contemplated by a person having ordinary skill in the art may be considered as within the scope of the present disclosure.

In some embodiments, upon instantiation or upon request, the enclave 112 generates a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and the enclave 112 may provide the public key of the key-pair to a trusted entity and retain the private key of the key-pair securely within the enclave 112 where it may not be accessible to outside entities. Subsequently, the trusted entity may encrypt data and/or instructions using the public key and provide the encrypted data and/or instructions to the enclave 112, whereupon the enclave 112 may decrypt the data and/or instructions using the private key held within the enclave 112. Alternatively or additionally, the enclave 112 may digitally sign results of processing or execution using the private key within the enclave 112 to provide assurance to the trusted entity the output has not been tampered with or forged.

In other embodiments usable in combination with other embodiments, the trusted entity may generate a set of cryptographic keys for encrypting, decrypting, and performing integrity validation of data passing between the enclave 112 and another entity. In some cases, the set of cryptographic keys may be a key-pair based on an asymmetrical public-private cryptographic scheme, and the trusted entity may provide the public key of the key-pair to the enclave 112 and retain the private key of the key pair. Subsequently, the enclave 112 may encrypt data and/or results of processing or execution using the public key before providing the data and/or results to the trusted entity, whereupon the trusted entity may decrypt the encrypted data and/or results using its private key. Alternatively or additionally, the trusted entity may digitally sign data and/or instructions provided to the enclave 112 using the private key of the trusted entity to provide assurance to the enclave 112 that the data and/or instructions have not been tampered with or forged. Alternatively or additionally, in a technique referred to as enveloping, the enclave 112 may provide the trusted entity with a session key encrypted using the public key of the trusted entity. Subsequently, the enclave 112 may provide encrypted data and/or results of processing of execution, whereupon the trusted entity may decrypt the encrypted data and/or results using the session key.

A computer system for hosting enclaves may be a distributed system with multiple hosts, may be a single system with virtual machine instances or may be a networked combination of such systems. A computer system may provide access to users, customers, modules, applications, services, processes, programs, operating systems, and/or controlling domains. Some of the access provided by the computer system to these entities may include providing access to confidential data and/or privileged applications. A computer system may also provide data storage regions to the customer, including memory, disk storage, virtual memory and virtual disk storage. Consequently, some of the data storage regions provided by the computer system may be configured to store confidential and/or otherwise significant data.

A computer system for hosting enclaves may also run entities, such as applications, processes, services and modules, configured to access and/or manipulate such confidential data. A computer system may also run applications from a computing resource service provider that may utilize privileged code or perform operations on confidential data. Additionally, a computer system may include operating systems, privileged users and/or controlling domains that may have full access to the computer system resources, including direct access to computer memory, central processing units, data storage, networks and/or other computer system resources. A customer may wish to secure confidential data, and any applications configured to access such confidential data, by preventing access to the data and/or applications by entities without proper credentials, even those entities that are typically trusted entities such as operating systems, privileged users, and controlling domains. Similarly, a computing resource service provider may also wish to secure such confidential data and any applications configured to access the confidential data by preventing access to the confidential data and applications by any entity without proper credentials.

An entity, such as a service or operating system running on the host computer system, the controlling domain, a guest domain running a virtual machine instance, or a service or operating system of the controlling domain or a guest domain, may provide an interface to enclave functionality. A user (e.g., a person operating a device running applications) with access to a virtual machine instance on the host computer system may use that interface to the enclave functionality to, for example, create an enclave, populate the enclave, and/or obtain keys. In an illustrative example, a host computer system may provide enclave functionality, as noted, via the Software Guard eXtensions instruction set that may be enabled on a processor of the host computer system, although the scope of the present disclosure extends to other enclaves. The physical hardware of the host computer system may be any device or equipment configured to execute instructions for performing data computation, manipulation or storage tasks, such as a computer or server. The host computer system may be equipped with a processor, including a central processing unit, a graphics processing unit, or a digital signal processor. The host computer system may further include memory, including static and dynamic volatile memory, and non-volatile persistent storage such as optical and magnetic storage disks, tape, and flash memory. The host computer system may also include additional hardware such as buses, input/output ports, and networking equipment compliant with any handshaking, communications or data transfer protocol.

In some embodiments, the enclave functionality is provided as an application, process, or module, and may, in some cases, be implemented as a single instance on a host computer system providing enclave functionality for virtual machine instances. An entity, such as an application, process or module, configured to provide enclave functionality may also operate on a remote machine and/or may provide enclave functionality in a distributed and/or hierarchical manner. This application, process, or module may further be configured to start automatically when a host machine and/or virtual machine is started, or, alternatively, may be started as needed (e.g., when a client entity requests access to the enclave functionality).

As noted, a host computer system may provide enclave functionality through instructions made to a processor configured to support a secure execution environment, such as Software Guard eXtension or trusted platform module instructions, or through a hypervisor. The enclave functionality may be provided to various other services running on the host computer system. For example, a virtual computer system service of a computing resource service provider running on the host computer system may provide enclave functionality to a virtual machine instance running under the control of the virtual computer system service. Similarly, other services including block-level data storage services, cryptography services, on-demand data storage services, archival storage services, notification services, authentication services, policy management services, billing services and task services may also access the enclave functionality to provide that functionality to resources associated with those services. Enclave functionality may also be provided to a customer of the computing resource service provider. For example, a user (e.g., a person operating a device running applications) with access to a service and/or access to the resources served by that service may use enclave functionality to further secure data and/or applications associated with that service. In an illustrative example, a virtual computer system service and/or a virtual machine instance associated with that virtual computer system service may use the enclave functionality to create an enclave, populate the enclave with data and/or applications, obtain keys for decrypting results from the enclave, start the applications within the enclave and receive updates.

Measurements may indicate a current state of the enclave 112 and/or contents within the enclave 112. The measurements may be evaluated within the enclave 112 or may be sent outside the enclave 112. The measurement may be in the form of a hash value of executable instructions and/or data in enclave 112 memory at the time of the measurement. Enclaves may be configured such that measurements are performed entirely within a secure portion of the processor and may also be configured so that the measurements are signed by secret material provided by the processor, such as, for example, microcode running on the processor or a private key. In this way, measurements may be verified as correct by trusted users using the functionality provided with the enclave. Measurements may be verified by, for example, an application programming interface that may provide information usable to determine the state of a processor.

The measurements may be based on measurements obtained from host computer system hardware, such as, for example, measurements obtained by utilizing Software Guard eXtension instructions supported by a processor of the host computer system. In order to obtain the measurement, the enclave 112 may first need to be paused or frozen by halting the execution of applications running within the enclave 112 and/or by placing the applications in a certain determined state. By pausing and/or freezing the applications and/or placing the applications in a determined state, external verification that the enclave 112 and its contents have not been tampered with may be made by comparing the measurements with predicted values. Measurements, in some embodiments, include verification and/or validation that the measurements were performed by a trusted, verified and/or validated source. For example, measurements performed by a processor executing the appropriate Software Guard eXtension instructions may be digitally signed by the processor and thereby verified as coming from the particular processor. Likewise, measurements coming from a trusted platform module may include a similar verifiable signature with the measurements as an assurance that the measurements were performed by the trusted platform module and/or a process running on the trusted platform module.

In some embodiments, the computing resource service provider or the enclave provides a key to the parties to the multi-party computation so that the literal input values provided by the parties may be securely provided to the provider. For example, upon instantiation of an execution instance for the multi-party computation, the computing resource service provider or the enclave may generate a public-private cryptographic key pair. The computing resource service provider may then provide the parties with the public key of the key pair, while the private key is securely retained by the provider or within the enclave. The parties may then encrypt their input values before providing the input values to the computing resource service provider so that, even if the input values are intercepted by an adversary, the input values may not be read. Once received by the entity holding the private key (e.g., the computing resource service provider or enclave), the input values may be decrypted using the private key and evaluated. Note that other secure communication methods as would be understood by a person having ordinary skill in the art is contemplated as being within the scope of this disclosure, such as enveloping a session key for each party to the multi-party computation. Note that an added benefit of the enclave holding the private key may be that all entities outside the enclave, even the computing resource service provider, will be unable to read the encrypted input values.

Once all input values have been received, the application programming interface 106 may cause the enclave 112 to evaluate the function $f(a, b)$, or it may be that, once all input values have been received, another application programming interface call from at least one of the parties 102A and 102B may be made to commence the evaluation (e.g., "evaluateFunction( )"). Once the function $f(a, b)$ is evaluated, the result may be provided as the output 110. In some cases, additional application programming interface calls configured to request the output 110 and destroy the input values 104A and 104B (e.g., erasing all traces of input values 104A and 104B from computer-readable memory) may be made available by the computing resource service provider 108.

Figure 2:
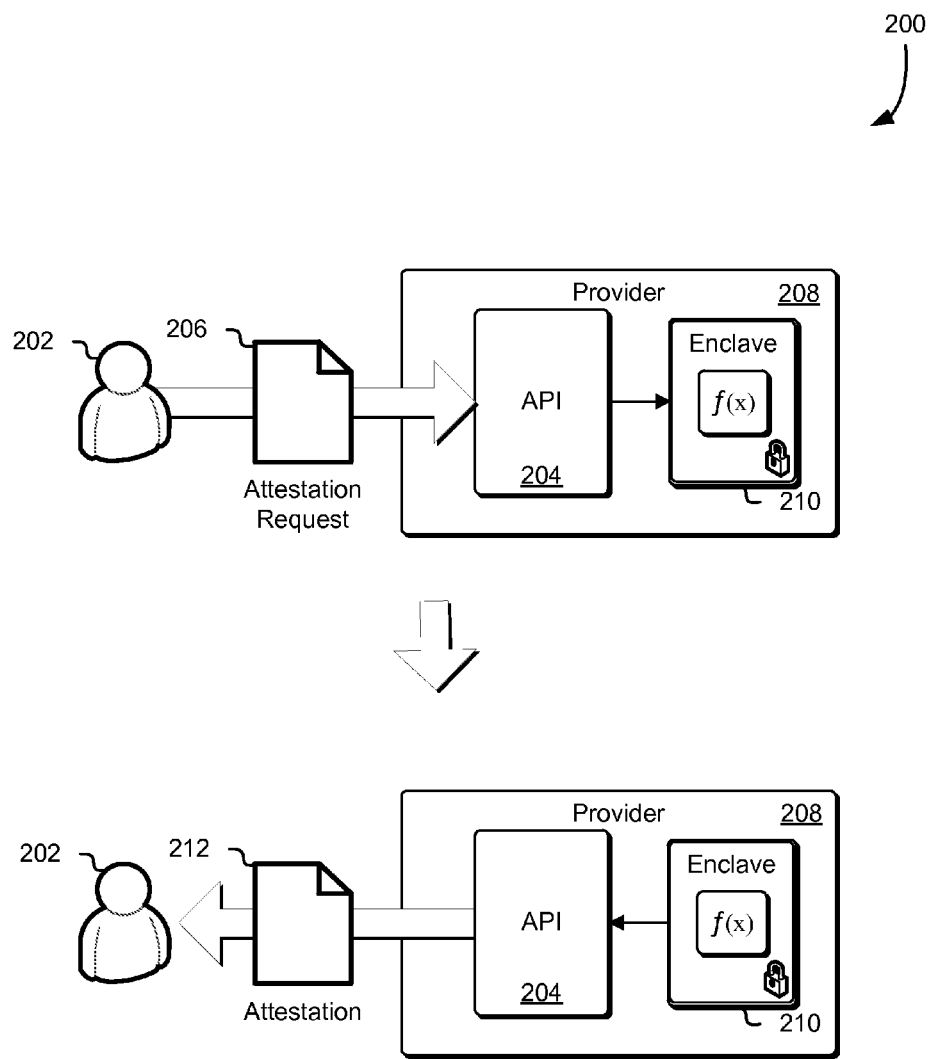
FIG. 2 illustrates an example of providing an attestation for a multi-party computation function and execution instance in accordance with an embodiment.

FIG. 2 illustrates an aspect of an environment 200 in which an embodiment may be practiced. Specifically, FIG. 2 depicts an example of a party 202 requesting and receiving, through an application programming interface 204, an attestation of a function designated to perform a multi-party computation. As noted, the party 202 may be any type of entity, including an individual, an application, a system, a service, and a resource. In a first stage, the party 202 may make an attestation request 206 via a call to the application programming interface 204. In some cases, the attestation request may be made through a graphical user interface provided by the provider 208, and in other cases may be made through a programmatic function call (e.g., requestAttestation(function_ID)).

The embodiment depicted in FIG. 2 shows the function $f(x)$ being evaluated within an enclave 210, such as the enclave 112 described in conjunction with FIG. 1, however, some embodiments of the present disclosure perform the multi-party computation without using an enclave; for example, the computing resource service provider 208 may perform the multi-party computation as a trusted third party mutually trusted by both parties without a hardware or software-supported enclave. The application programming interface 204 may cause the enclave 210 to respond to the attestation request by providing a measurement 212 of the function, such as a cryptographic hash of the executable function code, usable to compare against an expected hash value to assure the party 202 that the function within the enclave 210 can be trusted. That is, the code of the executable function may be run through a cryptographic hash algorithm such that the resulting hash may be used to verify that the code of the executable function has not changed or been tampered with. Examples of cryptographically verifiable hashes include MD5, SHA1, and SHA2 hashes. In an embodiment without an enclave, the computing resource service provider 208 may generate the measurement 212, by generating a hash value of the executable function code, natively without the use of an enclave.

Figure 3:
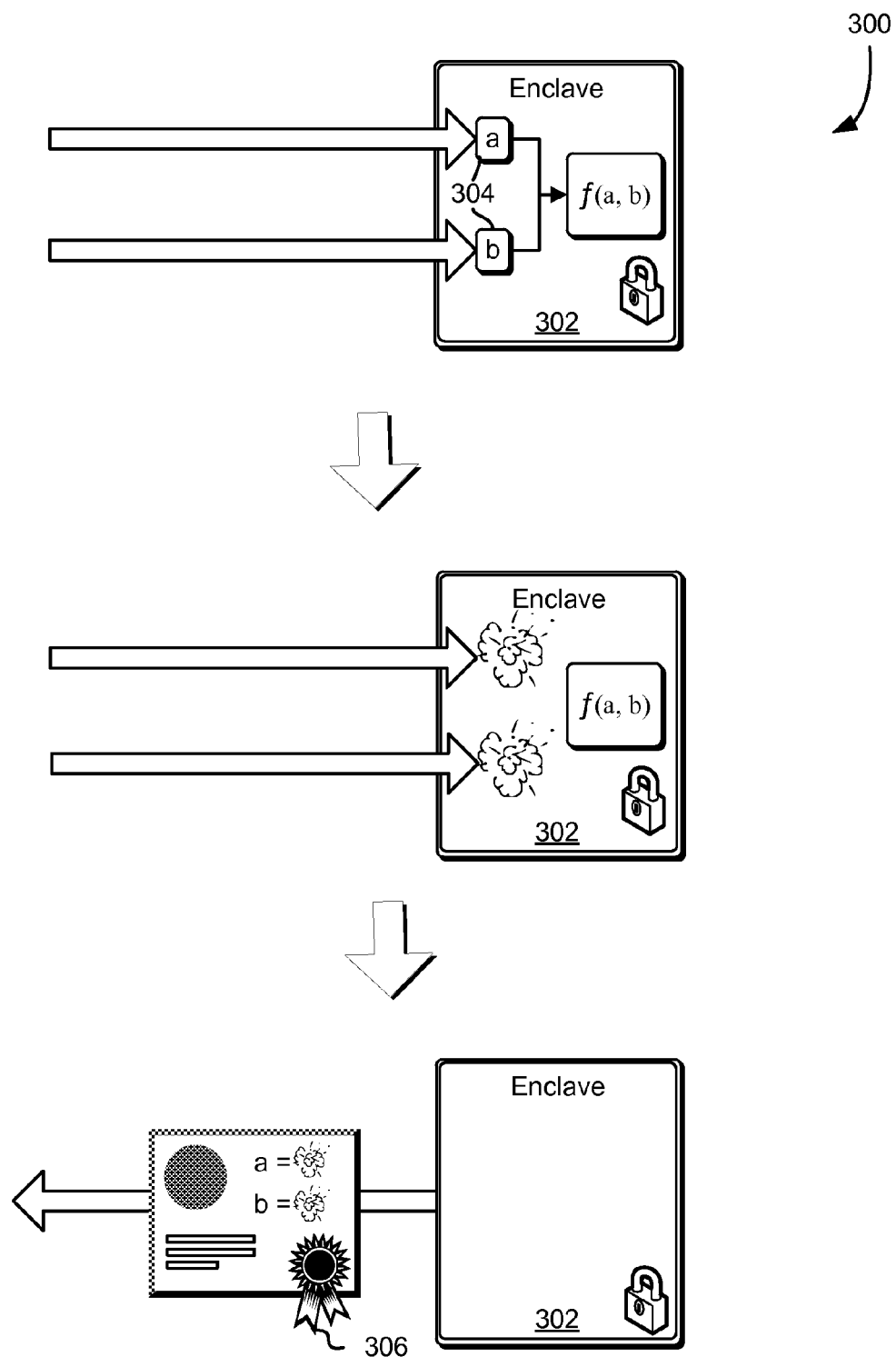
FIG. 3 illustrates an example of erasing inputs of a multi-party computation in accordance with an embodiment.

FIG. 3 illustrates an example of an enclave 302 destroying (i.e., expunging) the input values 304 provided. As noted, the input values 304 may be any type of input, including integers, alphanumeric strings, bitmaps, floating point numbers, record structures, BLObs and multidimensional arrays of any of the mentioned input types. After the evaluation of the function has been performed, the enclave may receive a request from a party, such as the party 102A or party 102B described in reference to FIG. 1, or other authorized entity to destroy one or more of the input values 304. In some cases, the input values 304 may be destroyed automatically after the result of the function has been generated.

One of the factors of a secure multi-party computation is that each party of the secure multi-party computation does not trust other parties to have access to the input values of that party. Hence, each party is said to be mutually-distrustful of the other parties. Secure multi-party computation permits these mutually-distrustful parties to jointly compute a function without any party revealing that party's input values to the other parties (i.e., the distrusted parties). Therefore, destroying the input values provides additional assurance to the parties that the input values no longer exist for the distrusted parties to obtain.

Destruction of an input in this context comprises eradicating any trace of the input values in computer memory, including any trace of the input values in the output or any value in memory or the output from which an input value may be determined. In some embodiments, the input values 304 are destroyed by erasing the cryptographic key associated with the evaluation of the function, such as erasing the private key of a public-private key pair generated by the enclave 302 for encrypting/decrypting the input values 304. In other embodiments, the input values may be destroyed by terminating the enclave 302. In still other embodiments, the enclave 302 is configured to have a function (e.g., "destroyInput(input_ID)") that, when called, renders the input values inaccessible, such as by erasing the input values 304 from enclave memory (e.g., overwriting the input values with zeroes in the memory regions occupied by the input values) or erasing the cryptographic key associated with the input values. In other cases, the input values may be automatically destroyed once the result of the function evaluation is provided.

The enclave 302 may provide a certificate of destruction 306 attesting that the input values have been destroyed. In some cases, the certificate of destruction 306 may be provided together with the function evaluation result. In other cases, the certificate of destruction 306 may be provided separately or upon request through an application programming interface call. Note that in some embodiments, the parties may view the function to confirm that the function is configured to destroy the input values and, before submitting their input values, the parties may request an attestation from the computing resource service provider for the function. If this attestation is confirmed, the parties may trust that the input values will be destroyed, and therefore, in these embodiments, the parties may be assured that the input values were destroyed without additional assurances of the certificate of destruction 306.

Figure 4:
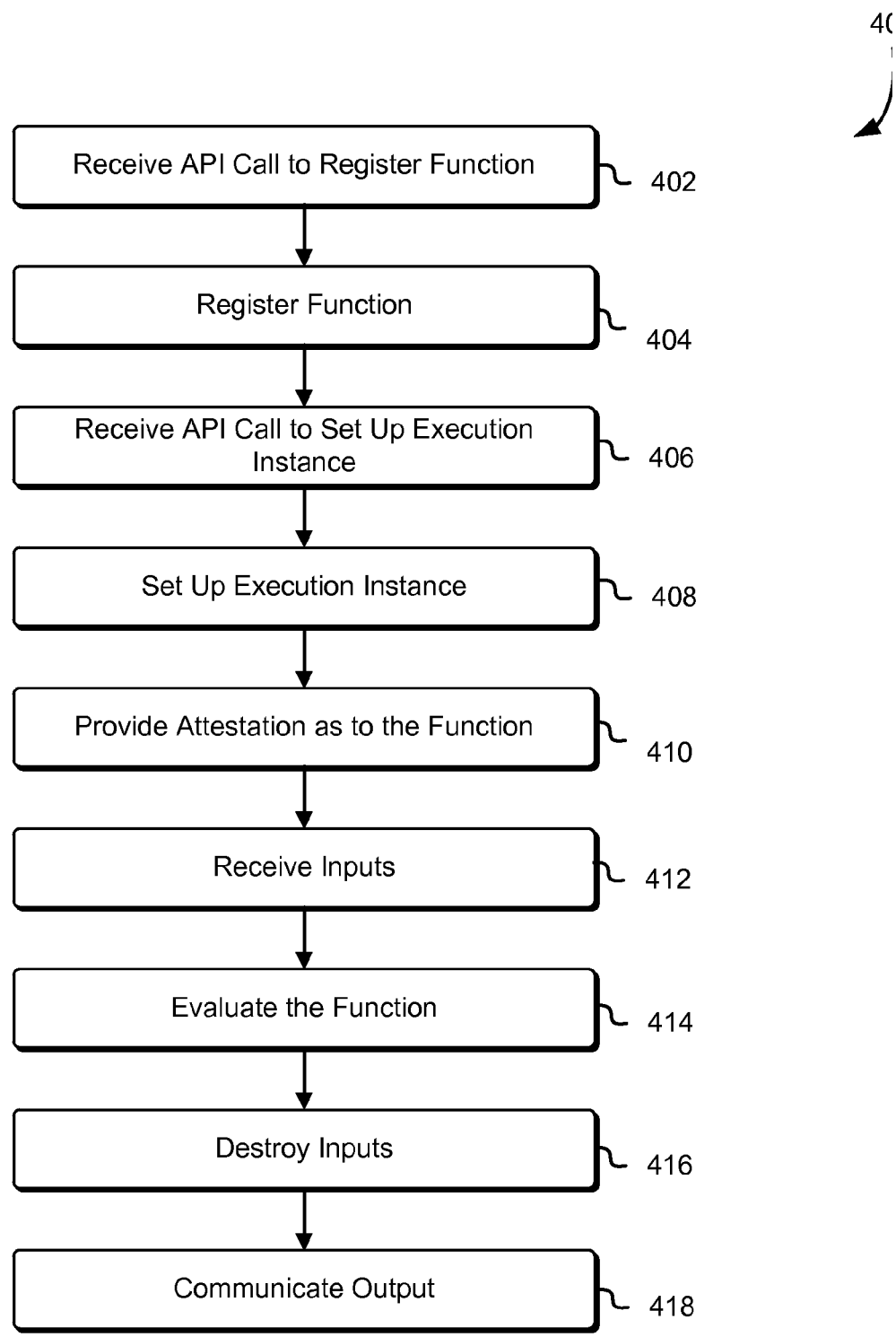
FIG. 4 is a block diagram that illustrates an example of a service for providing multi-party computation in accordance with an embodiment.

FIG. 4 is a block diagram illustrating an example of a process 400 for performing a multi-party computation in accordance with various embodiments. The process 400 may be performed by any suitable system such as such as a server in a data center, by multiple computing devices in a distributed system of a computing resource service provider, or any electronic client device such as the electronic client device 1102 described in conjunction with FIG. 11. The process 400 includes a series of operations wherein multiple parties provide input values, a multi-party computation is performed, and an output is produced by the system.

The system performing the process 400 may provide an application programming interface whereby a party, such as a customer, an application, a service, or a resource, may provide a function to the system. In some embodiments, the party provides the function by selecting a function from a library of functions made available by the system. For example, the computing resource service provider may have a library that contains a function that determines the average of N input values and the party may select the function from the library of functions to use for the multi-party computation. Another example of a function the library may contain may be a cryptographic function where the input values are Shamir secret shares of a cryptographic key and, in some cases ciphertext or plaintext, and the output may be a result of having reassembled the key and, in the cases where ciphertext or plaintext was provided as input, a result of a cryptographic operation performed on the ciphertext or plaintext using the reassembled key. Alternatively, the application programming interface may allow the party to define or upload executable code for performing the function.

In some cases, the system may provide an application programming interface that allows the party to add a function to the library of functions of the system. It is considered as being within the scope of this disclosure that the computing resource service provider could offer customers a service to store functions or libraries of functions for multi-party computation or other purposes. In some cases, the computing resource service provider may charge the party for the cost of storing the function. In other cases, the party may make a function or function library usable by other parties and the computing resource service provider may charge the party based on usage of the functions by the party or other parties. Alternatively, the computing resource service provider may provide its own library of functions and charge parties based on their usage of the functions in the library. As another alternative, the computing resource service provider may charge parties based on computational usage for the multi-party computation (e.g., processing and/or memory usage incurred in evaluating the function. In some of these embodiments, a single party may be charged (e.g., a party that is a customer of the computing resource service provider), whereas in other embodiments two or more of the parties may be allocated shares of the costs of the multi-party computation. Thus, billing or accounting records of a customer and/or one or more parties of the multi-party computation may be updated to reflect the cost or charge for performing the multi-party computation.

Thus, in 402, the system performing the process 400 receives an application programming interface call to register a function for use in a multi-party computation operation, which, as noted, may be a selection from a function library or may be a function definition provided by a customer of the computing resource service provider, and in some cases the function definition may be added to a function library of the computing resource service provider. In some of the latter instances, the function definition may be added to a global library, available to other customers, may be added to a library accessible to the parties performing the particular multi-party computation but not to the public, or may be a library of function specific to the particular customer.

The function may be a mathematical formula, or may be any sort of executable code or script, including low-level, high-level, and very high-level programming languages. Possible functions include simple functions, such as functions that compute a mean, mode, or median, to functions that involve computationally intensive calculations and/or recursion. The function definition may be in the form of instructions executable by the system to return a value specific to the execution. In some cases, the execution of the function may be configurable to specify who is allowed to provide input values to the function. For example, the function may be configured to calculate the average of three values, and a first party may be the authorized party to provide the first value, a second party may be the authorized party to provide the second value, and a third party may be the authorized party to provide the third value.

In some embodiments, the results of the function are publicly available or may be provided to any requesting party and may be digitally signed or certified by the service or container (e.g., hardware or software-protected enclave, etc.) of the computing resource service provider as the entity that computed the result. In other embodiments, only members of the parties supplying the input values may be allowed to obtain the result. In still other embodiments, the output (i.e., result) may be delivered to a specific party that was not a member of the parties providing the input alternatively or in addition to delivering the output to the parties providing the input values, or the output may be delivered to a subset of the parties providing the input values.

Note that the computing resource service provider may also determine whether the party requesting registration of the function is authorized to make the request. If the requesting party has insufficient permissions to select a function or add a function to the multi-party computation library, the computing resource service provider may disallow the request and the system performing the process 400 may terminate the process 400. Otherwise, whether the party provides a function or a function is selected from a library of functions, once the function is selected or submitted, in 404, the system may respond by providing the party with an identifier corresponding to the function and register the function identifier for use with a particular multi-party computation. By use of such an identifier, the party may be able to directly refer to the function through various application programming interface calls, such as when providing input values or requesting an attestation as to the state of the function.

The system performing the process 400 may further provide an application programming interface whereby a party may cause an execution instance to be instantiated for the multi-party computation. The operations of 406 reflect a party submitting a request to a web service or computing resource service provider through such an application programming interface to create an execution instance for the function or functions selected and registered in 402-04. Note, that in some embodiments, there is no separate application programming interface for setting up an execution instance as an execution instance may be caused to be instantiated in response to the application programming interface call selecting a function of 402, may be an operation performed in conjunction with registering the function per 404, or may be instantiated in response to providing an attestation and/or receiving inputs of 410 and 412 respectively.

Note that the computing resource service provider may also determine whether the party requesting registration of the function is authorized to make the request. If the requesting party has insufficient permissions to have an execution instance instantiated for a multi-party computation, the computing resource service provider may disallow the request and the system performing the process 400 may terminate the process 400. Otherwise, in 408, the execution instance for the function may be instantiated. In some cases, the operations performed in 408 may occur before or in concurrence with 402. The execution instance may be the environment in which the function may be evaluated, which could include an enclave or virtual machine instance and may further include an interpreter for evaluating the function. Similar to how the function may be assigned an identifier, the execution instance may also have a designated identifier that may be provided to parties for use in specifying the execution instance, such as in application programming interface calls. Furthermore, also similar to how parties may request an attestation as to a function, in some embodiments, parties request an attestation as to the state of the execution instance, such as by making an application programming interface request and specifying the execution instance identifier (e.g., "requestInstanceAttestation(instance_ID)"). Note too that multiple instances may be instantiated for the multi-party computation, with each instance configured to receive different inputs and/or function components (e.g., sub-functions of the overall composite function) for evaluating the function. In this manner, the inputs and/or function components may be isolated from the other parties, input values, and components, reducing the risk of compromise to the parties' input values. In some cases, execution instances are instantiated upon request by a party, whereas in other cases, execution instances are already created by the computing resource service provider and the identifiers of the execution instances may be provided to the parties upon request. In the latter case, there may be embodiments where one or more enclaves may be instantiated for the execution instances in response to the request.

In some embodiments, a party provides input values and specifies one or more conditions for which the input values may be used. For example, the party may provide an input value along with a directive to the computing resource service provider that the input may only be used if a measurement of the function matches an expected measurement provided by the party, otherwise the computing resource service provider must erase the input value from memory (e.g., overwriting the input values with zeroes in the memory regions occupied by the input values). In other embodiments, a party may make an application programming interface call to the system requesting information about what a running instance will do if the party provides input values to the running instance. The system may respond with information that may include the script of the function, a measurement of the function, information about who may have been authorized to provide input to the function, and which parties may receive the result. In some embodiments, the response includes a public key usable by the requesting party to encrypt input values so that other parties and even the computing resource service provider may not be able to read the input values, and, in some cases, the response may be digitally signed with a private key of the enclave to certify that the information came from a particular secure environment, such as an enclave. In some embodiments, a web services front end usable to provide the functions, provide the input values to the running instances, cause the function to be evaluated, destroy the input values, and request the output is provided. In other embodiments, the running instances may have a network address and may be operable to receive those commands directly.

In 410, the system may respond to an attestation request from a party made through an application programming interface provided by the system. The attestation provides a measurement through which the party can be assured that the function provided by the party or the function selected by the party has not been tampered with. In an embodiment, an execution instance of the function may be queried by the parties providing the input values. Using the example of an input to a function, the first party could call a function to provide an input value, and the input may further be specified to have a condition, such as, the input is provided only under the condition that it only be used with the specified function. In some cases, the specified condition could be encoded in the function to be evaluated, and, in other cases, the condition could be specified along with providing the input values to the function. In some cases, the party may provide the input values only upon attestation that the function being run is a trusted function. For example, the attestation may be a measurement in the form of a hash value of the executable code in the memory of the system such that, should the code be changed in the slightest bit, the hash value will differ from an expected hash value of the code. If the measurement is the measurement expected by the party, the party might provide input values to the function, otherwise the party may decide not to trust the function and not provide input values to the function. The party may obtain the measurement by making a call to an application programming interface requesting an attestation of whatever function is running in a specified execution instance (e.g., "receiveAttestation(instance_id)").

When each party is satisfied that the function can be trusted, the parties may provide input values to the function in 412. In some cases, the system performing the process 400 may first determine that the party providing the input is authorized to provide the input before the input may be accepted; in some of these cases, multiple parties may be authorized to provide certain of the input values (e.g., in an example where one of the input values is data related to employment benefits, the data may be provided by multiple authorized members of a human resources department). Because the input values may be received from multiple parties, the input values may not necessarily be received concurrently. Because the input values may be received from different parties at different times, it may be that the system may not proceed to 414 until all input values have been received.

In some embodiments, components of the function are distributed among multiple execution instances. That is, each execution instance may comprise one or more functions (or sub-functions) code allowing it to partially evaluate (i.e., evaluate a component or portion of the overall function) the overall multi-party computation function using input values provided to that execution instance. The output of the function may then be generated based on results of the partial evaluations.

However, in some multi-party computations, only a threshold number of correct input values may need to be received, such as in the case of a Shamir secret sharing scheme, in order for the function to be evaluated. In such a case, it may be that the function need only receive the threshold number of input values before evaluating the function in 414, rather than all input values. Note that, in some cases, the input values may be secured; for example, the system of the computing resource service provider or an enclave of the system executing the function may generate a public-private key pair, hold the private key, and distribute the public key to the multi-party computation parties. In this manner, each of the parties may encrypt their input values with the public key and provide the encrypted input values to the system. Since only the system holds the private key, even if encrypted input values are intercepted by an adversary, interception may not be sufficient to determine the input values since the private key for decrypting the input values is held by the system. In some embodiments, the system generates separate public-private keys associated with each party (i.e., each party receives a different public key) for improved security. In some embodiments, the input values are provided through a web services application programming interface, and in other embodiments may be provided directly to the execution instance, such as directly communicating via a network address of the execution instance.

In an embodiment where the function is executed in an enclave, the input values may be encrypted, as noted, and held in the enclave that hosts an interpreter that evaluates the function. An example workflow may be that, an evaluation instance is started, an enclave may be instantiated, an attestation as to the state of the enclave may be provided, and the function script may be inserted into the enclave. Alternatively, the enclave may be launched with the function script. The enclave may provide to the web service and/or the parties providing the input values a key for encrypting the input values. In an alternative embodiment, when a party requests an attestation of the function evaluation instance through, for example, an application programming interface call (e.g., "describeEvaluation( )"), the attestation may be provided along with a key usable by the party to encrypt the input values before providing the input values to the computing resource service provider.

In some cases, functionality may exist whereby parties may query the system as to which parties have and have not yet provided input values. In some instances, when all input values are provided, the system performing the process 400 performs the operations of 414-14 to evaluate the function and provide the output automatically. In other instances, the operations of 414 and/or 418 may occur in response to an express request to evaluate the function and/or communicate the output respectively.

As noted, the function is evaluated in 414. In some cases, this may occur automatically after receiving all or a threshold number of input values from the parties, but in other cases the system may be caused to evaluate the function in response to an application programming interface call (e.g., "evaluateFunction( )"). As noted, the input values may be received by the system encrypted with a public key and the system may need to decrypt the input values with its private key in order to evaluate the function. In addition, as noted, it may be that all input values or a threshold number of input values need to be received by the system before the function may be evaluated, and, in some embodiments, the evaluation commences once the sufficient number of input values is received. In other embodiments, the function may be evaluated upon receiving an application programming interface call from a party.

In 416, once the function is evaluated, the input values may be destroyed by the system. In some embodiments, the input values are destroyed automatically once the function has been evaluated. In other embodiments, the input values may be destroyed in concurrence with communicating the output in 418. While in still other embodiments, the input values may be destroyed upon request by the parties through an application programming interface provided by the computing resource service provider. In some cases, the parties may request that their own input values be destroyed, while in other embodiments, a request received from any party to destroy input values all input values to be destroyed. Note that in some cases, not all input values will be destroyed; for example, some input values may be "provide once" values and may persist through multiple multi-party computations and other input values may be "provide each time" values and may be destroyed after being used in each multi-party computation. Destroying, or expunging, the input values may be performed in various ways, such as by erasing (e.g., zeroing out) the input values in memory of the system or by erasing the private key generated for encrypting the input values.

In some embodiments, the system provides a certificate upon destruction of the input values that certifies that the input values have been destroyed. An example of a certificate may be a message signed with a digital signature verifiable as having come from the system that the input values have been destroyed. In some cases, the certificate may be provided upon request from a party through an application programming interface provided by the computing resource service provider. In other cases, the certificate may be provided concurrently with the output provided in 418. In other embodiments, the parties may view the function to confirm that the function is configured to destroy the input value and, before submitting their input values, the parties may request an attestation from the computing resource service provider for the function. In these embodiments, the parties may, by confirming the attestation, trust that the input values will be destroyed without an additional assurance of the certificate.

Finally, in 418, the output of the function evaluation may be provided. In some cases, the output may be provided only to certain parties. In other cases, the output may be provided to any party. In still other cases, certain non-parties (i.e., at least one authorized third party) may be permitted to access the output. In some embodiments, the output is provided automatically once evaluation of the function is complete. In other embodiments, the output may be provided upon a request through an application programming interface provided by the provider. As noted, in some cases the input values may be destroyed once the output is communicated. In some cases, the output may be digitally signed with a private key held by the system. Alternatively or additionally, the output may be encrypted. Note that the operations performed in 402-12 may be performed in various orders and combinations, including in parallel.

An example application of the disclosed multi-party computation service would be where a pair of businesses are exploring a joint business venture and seek to find the amount customer overlap they have in their respective customer lists without revealing the identities of their actual customers. In a similar manner, the businesses may compare expenses, revenue, and other information without revealing the actual information in any determinable form to the other. Another application may be determining results of health survey data without revealing the answers to any particular survey question. In a similar manner, the disclosed multi-party computation service may be used to provide for secure recording and evaluation of voting choices.

Figure 5:
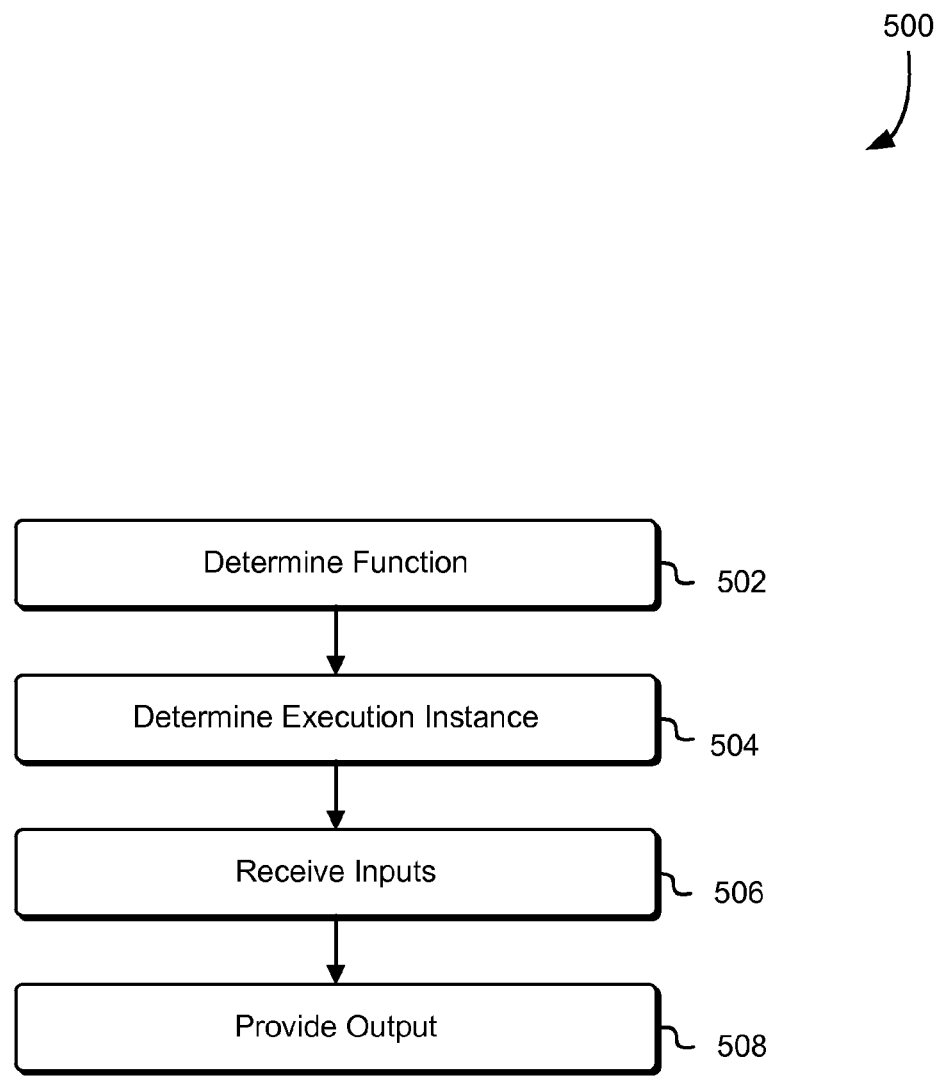
FIG. 5 is a block diagram that illustrates an example of a multi-party computation in accordance with an embodiment.

FIG. 5 is a block diagram illustrating an example of a process 500 for performing a multi-party computation in accordance with various embodiments. The process 500 may be performed by any suitable system such as a server in a data center, by multiple computing devices in a distributed system of a computing resource service provider, or any electronic client device such as the electronic client device 1102 described in conjunction with FIG. 11, or any electronic client device such as the electronic client device 1102 described in conjunction with FIG. 11. The process 500 includes a series of operations wherein a function is determined, an execution instance is instantiated, input values are received, and output of a multi-party computation is received.

In 502, a function for a multi-party computation is determined. The function may have been determined by a party to the multi-party computation selecting the function from a function library provided by a computing resource service provider or a web service of the computing resource service provider. In some instances, the function may be a function definition supplied by the party or may be a function created by a third party and made available to the computing resource service provider or the party for user in multi-party computations. In some cases, the function may be specified (e.g., selected from a function library or the function definition uploaded to one or more servers of the computing resource service provider) by one party of the multi-party computation and the specified function must be approved by some or all of the other parties of the multi-party computation before it may be used for the multi-party computation. In other cases, one party of the multi-party computation may be the party authorized to specify the function. In still other cases, providing input values indicates approval of the specified function by the parties to the multi-party computation.

As noted, in this context, a function refers to any mathematical function, series of mathematical functions, or executable code in any language as would be understood by a person having ordinary skill in the art that, when executed, yields one or more results. Following, or in concurrence with 502, the execution instance for the function may be determined in 504. An execution instance may be understood to be an environment configured to execute the multi-party computation function. In some embodiments, the execution instance may be a secure execution environment, such as an enclave protected by hardware or software, configured to cause a computer system to execute the function. Examples of such enclaves include secure execution environments supported by Intel® Software Guard eXtensions (SGX), a trusted platform module (TPM), or ARM TrustZone Technology or the bubble of safety described in U.S. patent application Ser. No. 14/476,520, filed Sep. 3, 2014, entitled "VIRTUAL SECURE EXECUTION ENVIRONMENT", which is incorporated by reference. In the operations of 504, cryptographic keys may be provided to the parties to the multi-party computation for encrypting input provided to the execution instance. In other embodiments, the execution instance may be an operating system, virtual machine instance, or an executable application configured to execute the specified function. In some cases, the input values and/or selection of the function may be provided through a user interface, while in other cases there may be public web servers through which parties of the multi-party computation can provide the input values directly.

An example of providing cryptographic keys may be a case where each party of a multi-party computation may provide the computing resource service provider, web service for multi-party computation, or the execution of the multi-party computation with a public key of a public-private cryptographic key scheme, while retaining a private key of the public-private key pair. The computing resource service provider, web service, or execution instance may encrypt a session key specific to each party with the provided public key and provide the encrypted session key to the appropriate party. The party may then decrypt the session key using the held private key and thereafter, input values provided to the computing resource service provider, web service, or execution instance may be encrypted with the session key and decrypted by the computing resource service provider, web service, or execution instance upon receipt of the input values.

Note that the determination of the function and instantiation of an execution instance may be the result of a party to the multi-party computation making a set of application programming interface calls to a service of the computing resource service provider. In some cases, the set may consist of a single application programming interface call; for example, an application programming interface call specifying a function may automatically result in the service of the computing resource service provider instantiating an execution instance for the function, or an application programming interface call to instantiate an execution instance may include a function identifier or function definition to be evaluated within the execution instance. In other cases, multiple application programming interface calls may be necessary to specify the function and/or instantiate the execution instance for evaluating the function.

In 506, the input values to the multi-party computation function may be received. In some cases, the parties to the multi-party computation may submit an attestation request as a part of the operations of 506 or 504. The attestation provided may be a measurement of the function and/or a state of the execution instance. The attestation may be in the form of a hash value of the executable code and/or data in memory. The party may compare the attestation with a known or expected value. For example, the party may take a measurement of the function definition using a method used by the provider (e.g., getting a SHA256 hash value of the function definition, launching the function in an enclave and requesting a measurement, etc.) before providing the function definition to the computing resource service provider; thereafter, the party may request an attestation of the function from the provider and may compare it against the expected measurement to confirm that the attestation is still a match and therefore has not been tampered with. In some cases, a demand for an attestation of the function may be performed during any stage of the multi-party computation.

In some cases, the attestation may include a description of what will happen to the input values. For example, the computing resource service provider may additionally respond with assurances that the input values and/or the execution instance will be erased (e.g., overwriting the input values with zeroes) or terminated upon completion of the multi-party computation. Additionally or alternatively, conditions may be attached to the inputs. For example, the party providing the input values may specify that the input values only be used for a specified function or execution instance and may specify whether the input values should be destroyed upon completion of the multi-party computation or whether the input values should persist to be used in another round of multi-party computation.

As noted, the input values may be any value upon which may be passed to an executable function for processing, including alphanumeric values, numeric values, and bitmaps. In some cases, the multi-party computation may wait until all input values are received before processing the multi-party computation. In other cases, components of the multi-party computation may be calculated as relevant input values may be provided; in these cases, the computation results may be temporarily stored in a persistent storage medium as a security measure to mitigate data loss in the case of a service interruption. Some input values may persist between rounds of multi-party computations and some input values may be provided from a data store hosted by the computing resource service provider. In the cases mentioned, in some embodiments the function is evaluated automatically once relevant inputs are received, and in other embodiments an application programming interface call may be made to initiate the evaluation of the function when the input values are received.

In 508, the result of the multi-party computation may be output. In some embodiments, the output is provided to each party to the multi-party computation, in some cases the output may be provided only to certain parties, and, in some cases, the output may be provided to specified third parties in addition to or instead of parties to the multi-party computation. The output may utilize the notification service 1016 described in FIG. 10 or may use any other type of notification method as would be understood by a person having ordinary skill in the art. In some instances, the output may be available upon request and, upon receiving the request, the computing resource service provider may first determine that the requestor is sufficiently authorized to receive the output before providing the output to the requestor. Note that the operations performed in 500 may be performed in various orders and combinations, including in parallel.

Figure 6:
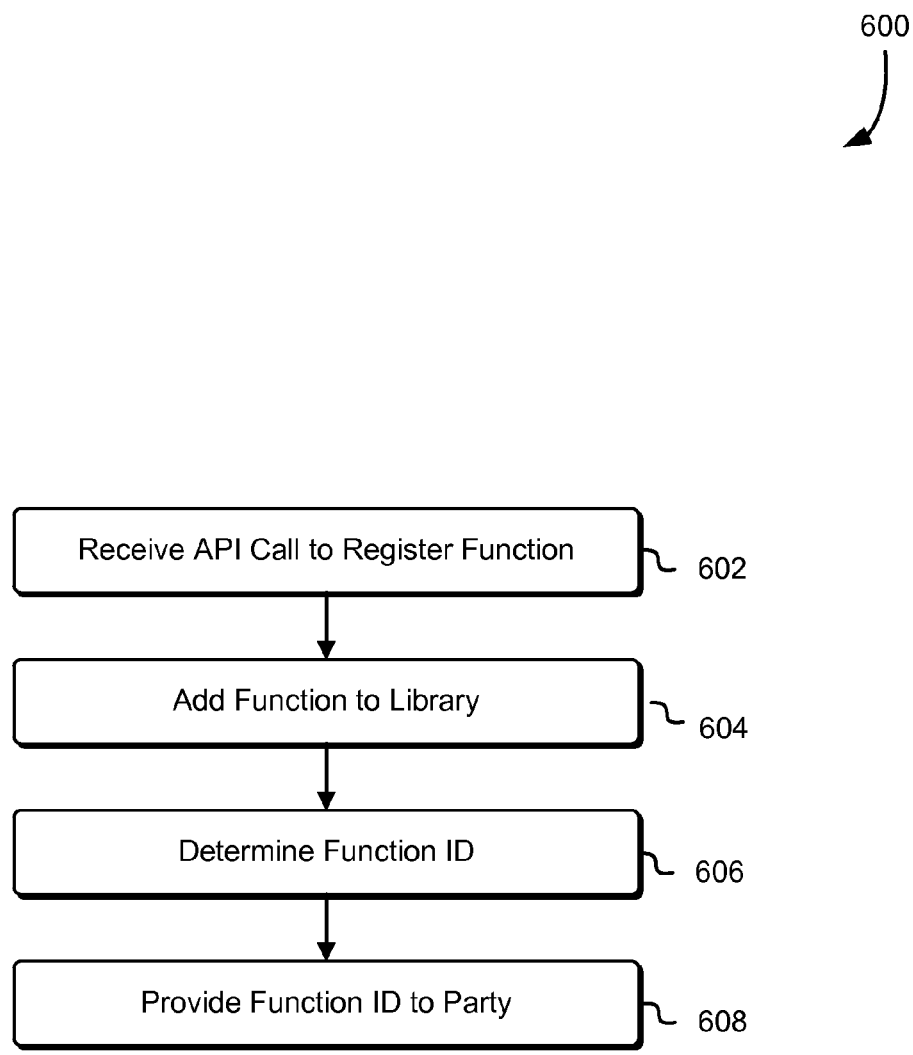
FIG. 6 is a block diagram that illustrates an example of registering a multi-party computation function in accordance with an embodiment.

FIG. 6 is a block diagram illustrating an example of a process 600 for adding a multi-party computation function to a function library in accordance with various embodiments. The process 600 may be performed by any suitable system such as a server in a data center, by multiple computing devices in a distributed system of a computing resource service provider, or any electronic client device such as the electronic client device 1102 described in conjunction with FIG. 11, or any electronic client device such as the electronic client device 1102 described in conjunction with FIG. 11. The process 600 includes a series of operations wherein a request is received to register a function provided, the function definition is added to a multi-party computation function library and a function identifier is assigned to the function, and the function identifier is provided to one or more parties to the multi-party computation.

In 602, an application programming interface request to register a function for a multi-party computation may be received. Note that in some embodiments, the request to register a function is made through a web service of a computing resource service provider, and in other embodiments a request may be made directly to a server, such as via a request sent to a network address of a server tasked by the computing resource service provider for providing multi-party computation functionality. The computing resource service provider may then determine whether the requesting party has sufficient authorization to have the function registered or to receive the function identifier. Upon determining that the requesting party is authorized to make the request, in some embodiments, the requestor or parties to a multi-party computation select the function from a function library held by the computing resource service provider, a third party, or one or more of the parties to the multi-party computation. In such embodiments, a function identifier may have already been generated for the particular function and the system performing the process 600 may skip to 608 and provide the function identifier to the requesting party.

In other embodiments, the function may be a function definition provided by the requesting party. In 604, such a function definition provided to the computing resource service provider may be added to a multi-party computation function library of the computing resource service provider and available for use by other customers of the computing resource service provider, in other cases the function may be added to a library only for use by parties of the multi-party computation of the requestor, and in other cases, the function definition may be provided for use only with the particular multi-party computation and may be erased after the multi-party computation is output. As noted, the function may be any function that a computer may utilize to evaluate input values to yield one or more results. As noted, an example of such a function may be a function that calculates an average of two or more input values, and may be coded in a low-level, high-level, or very high-level scripting language.

In 606, once the function is registered or in concurrence with the registering, an identifier for the function may be generated. The identifier may comprise words, numbers, letters, or symbols and may be generated according to a particular encoding system or may be arbitrarily generated, such as an automatically incremented integer. In some instances, the identifier may include metadata, such as a timestamp representing the date/time when the function was registered with the computing resource service provider, while in other instance the identifier may be designed to not provide any identifying information, such as an identifier in the form of a non-repeating cryptographically secure pseudorandom number.

In 608, the identifier of the registered function may be provided to the requesting party and/or other parties of the multi-party computation. In some cases, the computing resource service provider may have knowledge of the other parties of the multi-party computation based on a membership in a particular group configured to be authorized to provide input values to a particular multi-party computation. In other cases, the party members may be made known to the computing resource service provider as part of the request to register the function. In still other cases, party members or roles may be designated as authorized to provide input values to the function as part of the function definition, and the computing resource service provider may have knowledge of the party members based on this function definition or based on which users or customers have been assigned to the role specified in the function definition. The function identifier may then be used by the party members to specify which function is to be evaluated by an execution instance and/or which function that specified input values are being provided for. Note that the operations performed in 600 may be performed in various orders and combinations, including in parallel.

Figure 7:
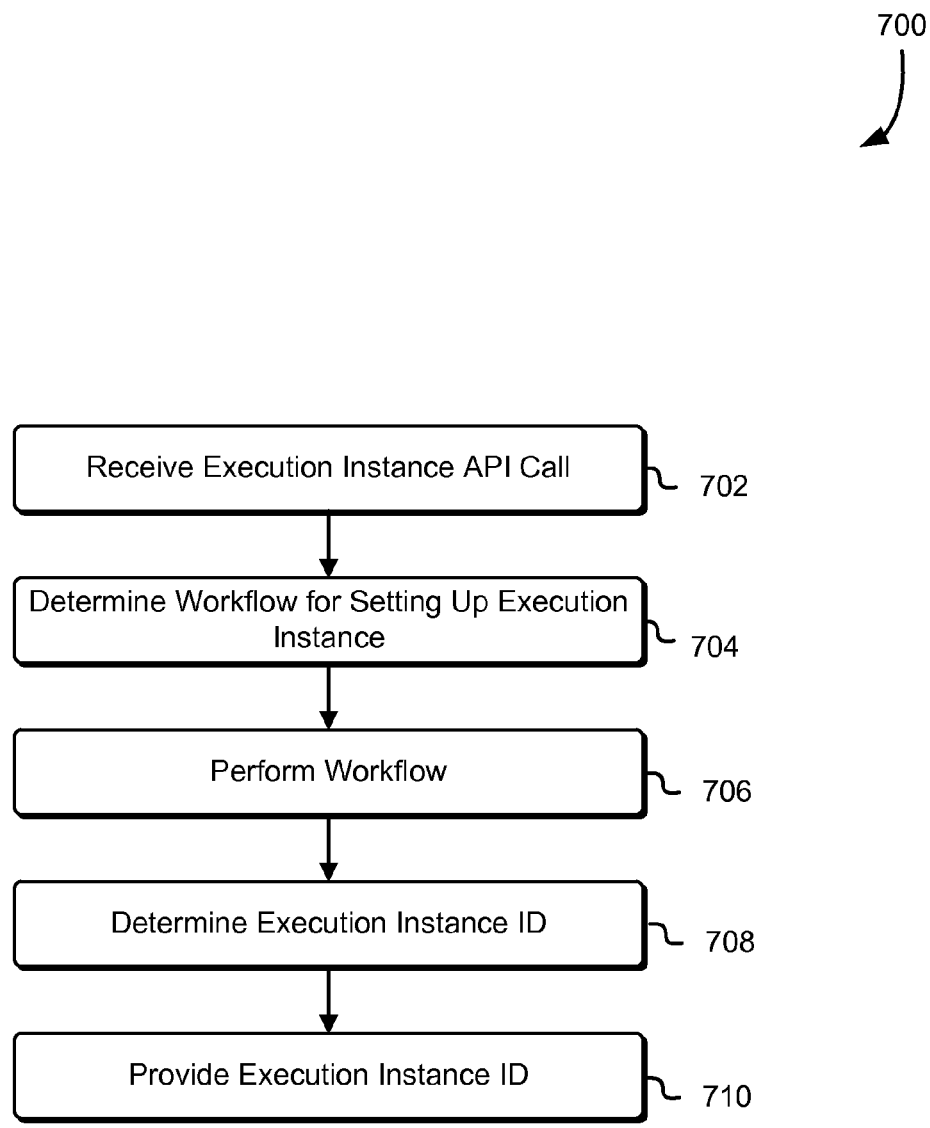
FIG. 7 is a block diagram that illustrates an example of instantiating an execution instance in accordance with an embodiment.

FIG. 7 is a block diagram illustrating an example of a process 700 for setting up a multi-party computation execution instance in accordance with various embodiments. The process 700 may be performed by any suitable system such as a server in a data center, by multiple computing devices in a distributed system of a computing resource service provider, or any electronic client device such as the electronic client device 1102 described in conjunction with FIG. 11. The process 700 includes a series of operations wherein an application programming interface call is received to instantiate an execution instance, the execution instance is set up and instantiated, and an execution instance identifier is generated and provided to the parties of a multi-party computation.

In 702, the computing resource service provider receives a request to instantiate an execution instance for the function selected in the process 600 of FIG. 6. In many cases, the request may include the function identifier determined in 606 of FIG. 6, however in some cases the execution instance may be created independently and the function or the function identifier may be provided later. In some of these cases, execution instances may be pre-instantiated and the operations of 704-06 may be omitted, and the execution identifier of a preexisting execution instance may be provided to the requestor and/or the parties of the multi-party computation. Furthermore, in some embodiments, the execution instance is automatically instantiated in response to the request received in 602 of FIG. 6, and in such a case 702 may be omitted from this process. Alternately, in some embodiments, the function selection or definition is provided through the request to instantiate the execution instance and the execution instance may be instantiated with the function, thereby omitting the operations of FIG. 6. Note too that the operations of FIG. 7 may be performed before, after, or simultaneously with the operations of FIG. 6.

Examples of execution instances of the present disclosure include, virtual machine instances, software or hardware secure execution environments such as enclaves, an operating system running on a host computer, and one or more host servers of a distributed computing system. The execution instance request may result in one or more execution instances being instantiated, and the one or more execution instances may be distributed or shared across one or more systems of a distributed computing system. For example, for a given multi-party computation, multiple enclaves may be instantiated and each of the multiple enclaves may be dedicated to a specific party of the multi-party computation. Additionally, in some situations, the multiple enclaves may be resident on the same host computer, whereas in other situations the enclaves may be distributed among multiple computers of a distributed computing system.

The specifics on setting up the execution instance are determined in 704. The workflow may include allocating memory, compute power, persistent storage space for the execution instance, determining which interpreter to use for the execution instance (i.e., which languages may be supported for the function definitions). The workflow may also include determining which parties are authorized to provide inputs to the execution instance, which parties are authorized to receive an attestation or other information as to the function and/or execution state of the instance, determining which parties are authorized to receive results of the evaluation of the function, and/or the manner in which parties may be notified as to the results of the evaluation of the function. The workflow may further include generating cryptographic keys, such as public and private keys of a public-private key scheme or enveloping a session key as described above, to provide to parties of the multi-party computation for encrypting the input values and providing the cryptographic keys to the relevant parties. In 706, the determined workflow is implemented, thereby causing one or more execution instances configured to execute the multi-party computation function to be available to the parties of the multi-party computation. In some cases, a workflow may be provided by a party of the multi-party computation, such as through an application programming interface call where the workflow may be defined by a set of parameters passed with the application programming interface call, or within the function definition of the multi-party computation function. In other cases, a workflow may be encoded with the web service or other service providing the multi-party computation functionality, while in other cases a workflow may be defined in a data set stored in a data store of the computing resource service provider.

In 708, an identifier is determined. In some cases, the execution instance may have been previously instantiated and the identifier may be obtained for the designated execution instance. In some of these cases, the parties of the multi-party computation may select an execution instance from a list of execution environments supplied by the provider and may be provided with the identifier for the selected execution instance. In other cases, the identifier for the execution instance may be generated anew. An identifier may be generated in a similar manner as described for 606 of FIG. 6; for example, the identifier may comprise words, numbers, letters, or symbols and may be generated according to a particular encoding system or may be arbitrarily generated, such as an automatically incremented integer. The identifier may include metadata, such as a timestamp representing the date/time when the function was registered with the computing resource service provider, or may be generated in a way that is designed to not provide any identifying information, such as by generating a non-repeating cryptographically secure pseudorandom number.

In 710, the execution instance identifier may be provided to one or more parties of the multi-party computation. As noted, the identifier may correspond to a single execution instance, or, in a case where multiple execution instances are instantiated for the multi-party computation, may comprise multiple identifiers corresponding to the multiple instances or may comprise a single identifier that corresponds to some or all of the execution instances. As an example of the latter, several execution instances may be instantiated for a particular multi-party computation and may be distributed across multiple host computers for parallel processing, load balancing, and/or fault tolerance purposes. To the multi-party computation parties, the multiple execution instance may be configured to appear to be a single execution instance and may be referenced by a single execution instance identifier even though multiple execution instances may be evaluating the same multi-party computation, evaluating different components of the multi-party computation, or receiving different input values from the parties of the multi-party computation. As well, in some cases, parties other than the parties of the multi-party computation may be provided with the execution instance provider; e.g., a third party may be authorized to request to receive status information regarding the execution instance using the execution instance identifier. Note too that the operations performed in 700 may be performed in various orders and combinations, including in parallel.

Figure 8:
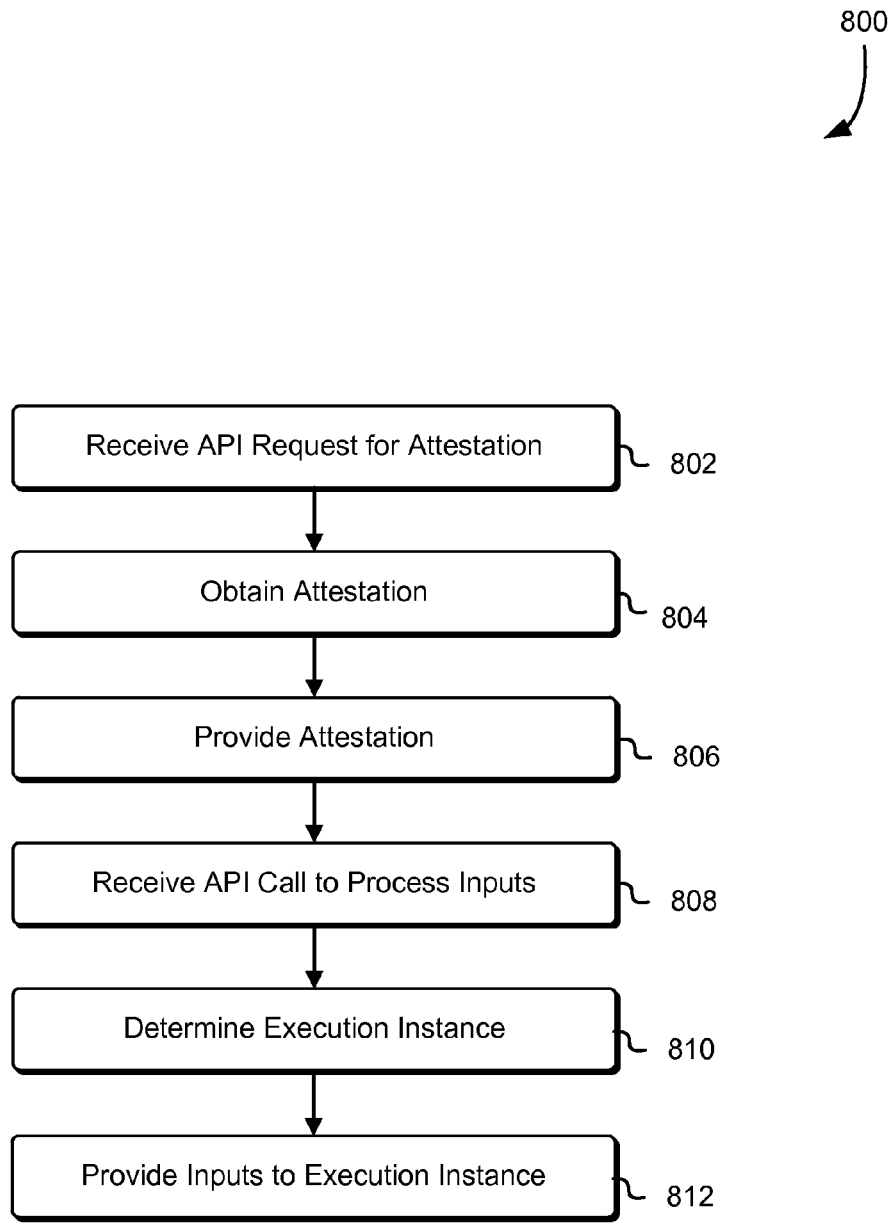
FIG. 8 is a block diagram that illustrates an example of receiving an attestation and inputs in accordance with an embodiment.

FIG. 8 is a block diagram illustrating an example of a process 800 for providing input values to a multi-party computation function instance in accordance with various embodiments. The process 800 may be performed by any suitable system such as a server in a data center, by multiple computing devices in a distributed system of a computing resource service provider, or any electronic client device such as the electronic client device 1102 described in conjunction with FIG. 11, or any electronic client device such as the electronic client device 1102 described in conjunction with FIG. 11, or any electronic client device such as the electronic client device 1102 described in conjunction with FIG. 11. The process 800 includes a series of operations wherein an attestation request is received from a party of the multi-party computation, an attestation is obtained and provided, and inputs are received and provided to an execution instance.

In 802, the attestation request is received. As noted, the requests described in FIGS. 5-9 may be calls made to a web service request through application programming interface provided by a computing resource service provider or may be function calls directly made to one or more applicable servers of the computing resource service provider, such as by referencing network addresses of the servers. Here, an attestation as to either the function and/or the execution instance may be requested. An attestation as to the function may be, for example, a measurement, such as a cryptographic hash value, of the function definition.

In 804, the attestation is obtained. For an attestation of the function, the execution of function may be started, the function may be frozen or may pause at a known state (e.g., waiting for an input value), and the measurement of the memory region storing the executing function may be made. The attestation may provide assurances to the parties of the multi-party computation that the function has not been tampered with and providing the attestation and verification that the attestation matches an expected measurement may be a condition attached by one or more parties before the input values may be provided or used. For an attestation of the execution instance, similarly the execution instance may be paused and a measurement of the execution instance memory may be made; in cases where the function and function instance utilizes a hardware or software enclave, this measurement may be performed by measuring the enclave or enclave memory, such as by sending an instruction to the enclave to take the measurement. Alternatively or additionally, an attestation of the execution instance may include metadata about the execution instance, such as its execution status (e g, running, stopped, waiting for input from party <X>, etc.), memory footprint, compute power utilization, running time, timestamp as to when it was instantiated, parties authorized to provide inputs and/or receive results, etc.

In 806, the system performing the process 600 map provide the requested attestation to the requestor, other parties of the multi-party computation, and/or specified third parties. In some cases, the evaluation of the function may pause until the parties respond that the provided attestation meets with approval and/or provide their input values (e.g., providing the input values may be presumed to indicate approval of the attestation). In some of these cases, the evaluation of the function or the function instance may terminate if no response is received within a predetermined time period or if one or more parties signals that the provided attestation does not meet with their approval.

In 808, the system performing the process 800 may receive the input values may from the parties of the multi-party computation. Note, for some multi-party computations, it may be necessary for input values to be received before the multi-party computation function may be evaluated, however, for some multi-party computation functions evaluation some components of the multi-party computation function may be configured to begin pre-processing without all of the input values being received. As well, some types of multi-party computation functions, such as a Shamir secret share scheme, may only need to receive a certain minimum number of inputs in order to evaluate the function; in such a case, the function may be evaluated once a threshold number of input values have been received. It is noted that for any requests or inputs received in the operations of FIGS. 4-9, the system performing the respective process may perform authentication operations to determine that the party or other entity sending the request has sufficient privileges to permit the request to be fulfilled, and if privileges are insufficient, the request may be denied and, in some cases, further processing of the respective process may be terminated as a result.

Note too, that there may be a minimum or maximum time period during which inputs may be submitted to the system performing the process 800. As an example, the multi-party computation function may be associated with an election or conducting a poll, and the poll may be held open for a certain time period, such as 30 minutes. Within that time period, the system may allow a party to re-submit input values during the time period as the party may have second thoughts and decide to change an input value (e.g., selected answer to a poll question, chosen ballot measure, etc.). In such a case, the system may be configured to accept only the first submitted input value or the last-submitted input value, while in other cases, it may be useful to retain all submitted input values for the multi-party computation. Another similar application of the present disclosure may be for multiple-choice exams or other type of scholastic examinations.

In 810, the execution instance destination of the provided input values may be determined. As noted, in some cases, there may be multiple execution instances instantiated for the particular multi-party computation, and different execution instances may be allocated to process different input values. The execution instance may be determined by an execution instance identifier provided by the parties with the input values and/or the attestation request. In other cases, the execution instance may be determined from a function identifier provided with the input values and/or the attestation request; for example, the function identifier may be mapped to one or more execution instances, and an execution instance may be selected from the mapped execution instances. Alternatively, inputs may be provided, such as to a web service of the computing resource service provider, and the receipt of the input values may cause the instantiation of the execution instance in a similar manner as the process of 700 described in reference to FIG. 7. Thus, the operations of FIGS. 6-8 may be performed in a variety of orders, including in parallel.

Lastly, the input values may be provided to the designated execution instance in 812 and the evaluation of the multi-party computation function may be performed. Note that the inputs may be provided all at once, may be provided as received, or at different points in the process. As described in the present disclosure, some input values may be provided once and their values retained for successive rounds of the multi-party computation, whereas other input values may be discarded after a round of the multi-party computation, such as described in reference to FIG. 3. Note that the operations performed in 800 may be performed in various orders and combinations, including in parallel.

Figure 9:
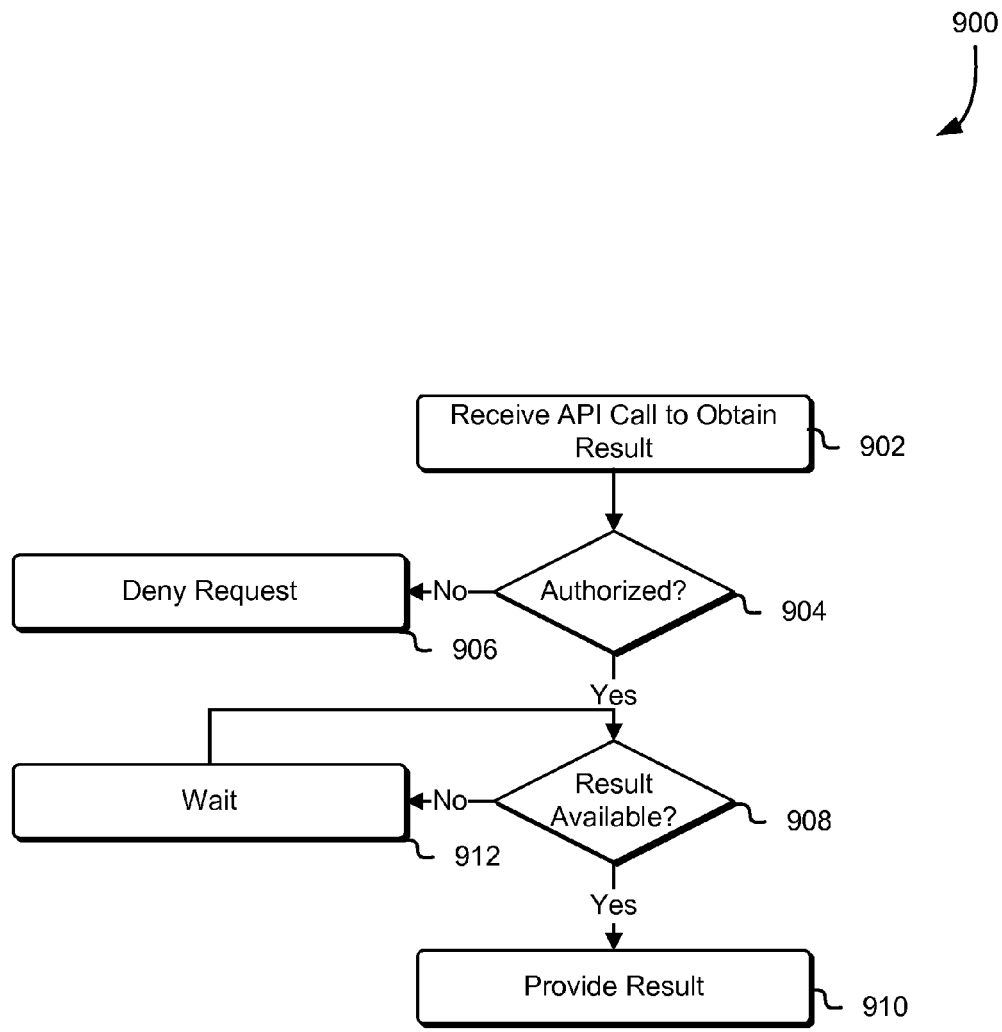
FIG. 9 is a flow chart that illustrates an example of obtaining a result of a multi-party computation in accordance with an embodiment.

FIG. 9 is a flow chart illustrating an example of a process 900 for providing a result of a multi-party computation in accordance with various embodiments. The process 900 may be performed by any suitable system such as a server in a data center, by multiple computing devices in a distributed system of a computing resource service provider, or any electronic client device such as the electronic client device 1102 described in conjunction with FIG. 11, or any electronic client device such as the electronic client device 1102 described in conjunction with FIG. 11, or any electronic client device such as the electronic client device 1102 described in conjunction with FIG. 11. The process 900 includes a series of operations wherein, after a multi-party computation has been evaluated, a request is received for the result of the multi-party computation, a determination is made whether the requestor is authorized to receive the result, and, if authorized, the result may be provided to the requestor.

In 902, a request may be received by the system performing the process 900 to receive the result of a multi-party computation. If request is prematurely received (e.g., the result has not yet been determined because the multi-party computation may not yet have completed, all required inputs may not have been received yet, an execution instance may not yet have been instantiated, or the function may not yet have been selected or provided), rather than determining whether the result is available by the operations of 908, the request may instead be denied, or in some cases, the request may be registered and the system performing the process 9 may proceed to the next operation once the result is available. The result of the multi-party computation may take many forms, depending on the function evaluated; for example, the result may be a cryptographic key, where multiple parties of the multi-party computation held data (provided as input values) necessary to reconstruct the cryptographic key, or the result may be a Boolean result indicating whether input values provided by a party (e.g., a username and password) is present within a list held by another party (e.g., a list of authorized username/passwords), or a bitmap reconstructed based on input values received from parties of the multi-party computation. Note that in some cases, the result may be automatically provided to parties of the multi-party computation and/or specified third parties once the evaluation is complete, and, in those cases, the operations of 902 may be omitted or consist of providing the identities of those authorized parties to the system as or before it performs the operations of 904 or 906.

In 904, the system performing the process 900 performs a check to determine whether the requestor is authorized to receive the requested result. As noted, the system may be configurable to provide the result to one or more parties of the multi-party computation and/or to specified third parties. In some cases, the provided results may differ based on the identity of the requestor. For example, a specified third party may only be authorized to receive information indicating that the multi-party computation has been evaluated, but not receive what the result of the evaluation is. Likewise, some more privileged parties, such as one or more parties of the multi-party computation may be provided with additional information, such as the result of the evaluation, the amount of time needed to perform the multi-party computation, costs incurred in performing the multi-party computation (e.g., the computing resource service provider may provide compute power for the multi-party computation for a fee based on usage or time), and a data size of the multi-party computation result.

If the requestor has insufficient privileges to have the request for the result be fulfilled, the system performing the process 900 proceeds to 906 whereupon the request is denied. Denying the request could involve logging the failed request, ignoring the request, responding to the request with an error message, notifying other parties of the multi-party computation that an unauthorized party has attempted to obtain the request, or any combination of these. Otherwise, the system performing the process 900 may proceed to 908 whereupon the system determines whether the result of the multi-party computation is available.

If the result of the multi-party computation is available, the system performing the process 900 may proceed to 910 whereupon the result may be provided to the requestor, other parties of the multi-party computation, and/or specified third parties. In some instances, the result may be provided to the requestor only, whereas in other instance, a request from a single requestor may cause the result to provide the result to additional parties authorized to receive the result. In some cases, the result may comprise more than one value, and in some cases, the result may be a continuous output, such as streaming audio or video or continuously updated ticker values of stock or some other market commodity.

Otherwise, in 912, to wait for the result of the multi-party computation. In some cases, the system performing the process may continuously poll the execution instance until the results are provided, and, in other cases, the system may wait for a predetermined amount of time and proceed to 908. It may be that the cycle of 908 and 912 may continue for a predetermined amount of time or cycles and may terminate with an error if no result is received after a threshold amount of time or cycles pass. Similar to the other processes of the present disclosure, the operations performed in 900 may be performed in various orders and combinations, including in parallel.

The multi-party computation function of the present disclosure may be usable for more than one round of calculations with some input values persisting from one round to the next. For example, a first input value may be considered a "provide once" input; that is, a party may provide the input value and the input value may not be destroyed between at least rounds of evaluating the function. An example of a "provide once" input may be a cryptographic key provided by a first party that may be used for more than one operation.

A second input value may be provided by the same or different party than provided the first input. However, in this example, the second input value may be a "provide each time" type of input; that is, the input value may be destroyed between rounds of evaluating the function. An example of a "provide each time" input may be a plaintext message provided by a second party so that it may be encrypted using a cryptographic key provided by the first party. Then, the function may be evaluated using the first input value and the second input value. Using the examples given above, the function may be evaluated to encrypt the plaintext message using the cryptographic key to yield a ciphertext output of the message. Once the output is determined, the second value may be destroyed or otherwise be caused to be inaccessible (e.g., erasing the second value from memory) in a similar manner as described in reference to FIG. 3. Note, however, in this example the first input value is not destroyed, but may remain available in memory for use by another operation.

The output may be provided to designated parties, which, in some cases the output may be all parties to the multi-party computation. In other cases, the output may be available to the public, and, in still other cases, the output may be provided to specific third parties. In some instances, the output may be provided to the designated parties automatically, whereas in other instances, the output may be provided upon request, such as through an application programming interface call. The system then may make a determination whether the function is likely to undergo another round of evaluation and whether to keep holding the first input value. If the first input value is no longer needed or there is a need to destroy the first input value, the first input value may be destroyed in a similar manner as described in reference to FIG. 3. Otherwise, the system may wait for receipt of a new second input value. For example, where the first input value was a cryptographic key, the second party may provide a new plaintext message to be encrypted with the same cryptographic key as was used for encrypting the previous plaintext message. Note that the operations performed in the process 900 may be performed in various orders and combinations, including in parallel.

Another example application of "provide once" and "provide each time" input values may be a website login where the "provide each time" input value may be a password provided by a user and the "provide once" input value may be a verification key or list of valid passwords provided by the website host. An additional example application may be a payment processing system where a customer provides "provide each time" payment information and a provider provides "provide once" payment information. Note that the function applied to a first input value need not be the same function applied to a second input value; that is, there may be multiple co-resident functions that share a similar state or transaction. As an example, a function definition may include a pair of functions, such as "createPreliminaryTransaction( )" and "chargePreliminaryTransaction," whereby "provide each time" input values may be provided to the first function to create a preliminary transaction, and the output of the first function may be provided to the second function with or without "provide once" input values to charge the preliminary transaction created by the first function. The overall objective being to provide a secure environment for sensitive input values and functions that would be resistant to tampering.

In some embodiments, there may be data stored in a data store of a data storage service of a computing resource service provider that is configured to be usable as input values to one or more functions of a multi-party computation of the present disclosure. An example of this may be health-related data stored in a data store and a library of functions approved for use by researchers to be used with the health-related data. In this manner, rather than having all input values provided by parties of a multi-party computation, some input values to the multi-party computation may be a set of values from the health-related data that may be configured as authorized to be used as input values to functions in the library of functions or for particular evaluation instances. For example, the function, library of functions, or evaluation instance may be added to a whitelist of functions allowed to use the data or may have been certified as being in compliance with a particular privacy-preserving rule. Additionally or alternatively, the data may be data pre-computed from the set of values from the health-related data, which may provide an additional layer of privacy by providing the data to the function such that the data is usable without the function having direct access to the health-related data.

Figure 10:
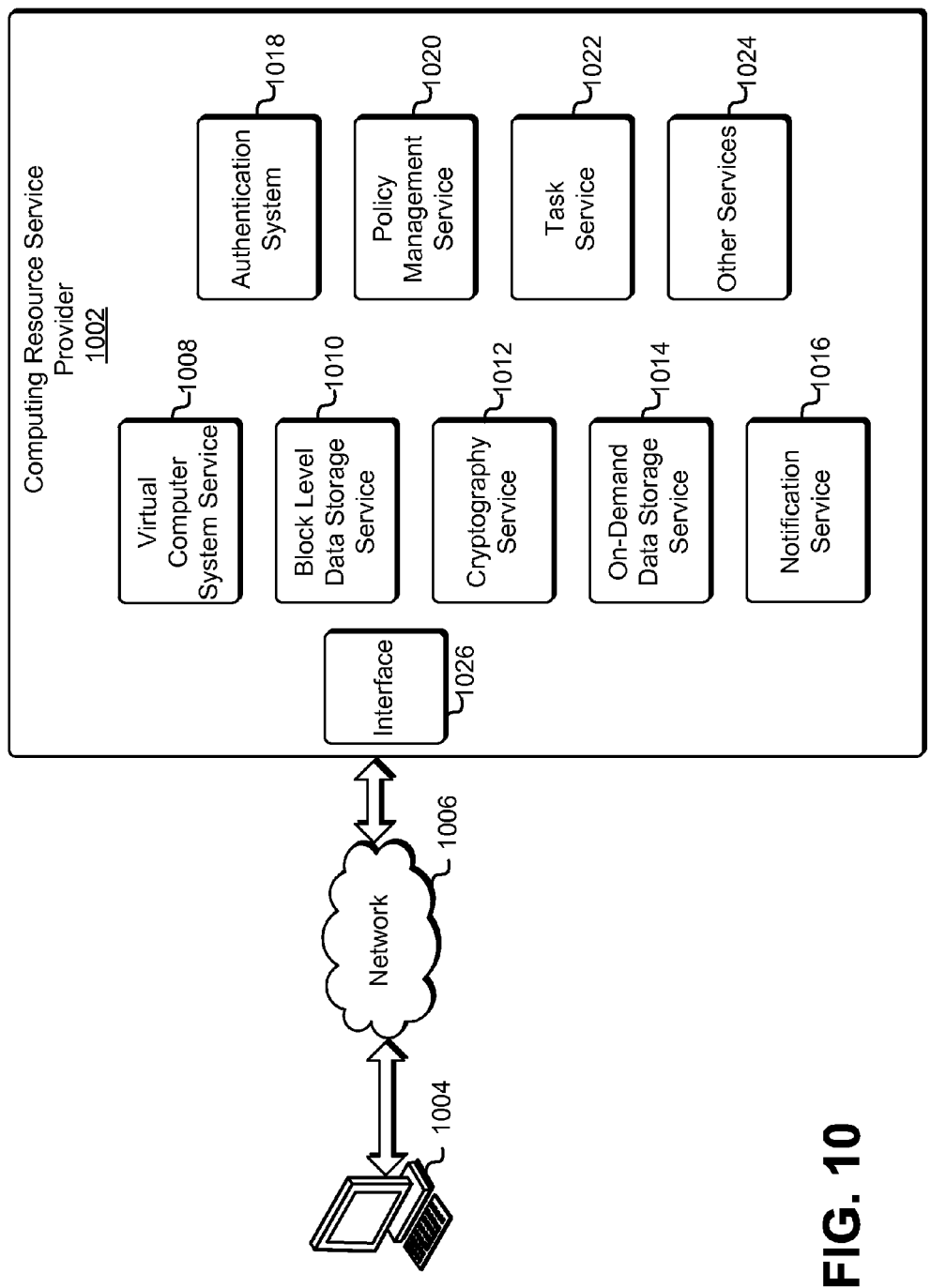
FIG. 10 illustrates an example of a computing resource service provider in accordance with an embodiment.

FIG. 10 shows an example of a customer connected to a computing resource service provider in accordance with at least one embodiment. The computing resource service provider 1002 may provide a variety of services to the customer 1004 and the customer 1004 may communicate with the computing resource service provider 1002 via an interface 1026, which may be a web services interface or any other type of customer interface. While FIG. 10 shows one interface 1026 for the services of the computing resource service provider 1002, each service may have its own interface and, generally, subsets of the services may have corresponding interfaces in addition to or as an alternative to the interface 1026. The customer 1004 may be an organization that may utilize one or more of the services provided by the computing resource service provider 1002 to maintain and deliver information to its employees, which may be located in various geographical locations. Additionally, the customer 1004 may be an individual that utilizes the services of the computing resource service provider 1002 to deliver content to a working group located remotely. As shown in FIG. 10, the customer 1004 may communicate with the computing resource service provider 1002 through a network 1006, whereby the network 1006 may be a communication network, such as the Internet, an intranet or an Internet service provider (ISP) network. Some communications from the customer 1004 to the computing resource service provider 1002 may cause the computing resource service provider 1002 to operate in accordance with one or more embodiments described herein or a variation thereof.

The computing resource service provider 1002 may provide various computing resource services to its customers. The services provided by the computing resource service provider 1002, in this example, include a virtual computer system service 1008, a block-level data storage service 1010, a cryptography service 1012, an on-demand data storage service 1014, a notification service 1016, an authentication system 1018, a policy management service 1020, a task service 1022 and one or more other services 1024. It is noted that not all embodiments described herein include the services 1008-1024 described with reference to FIG. 10 and additional services may be provided in addition to or as an alternative to services explicitly described herein. As described herein, each of the services 1008-1024 may include one or more web service interfaces that enable the customer 1004 to submit appropriately configured API calls to the various services through web service requests. In addition, each of the services may include one or more service interfaces that enable the services to access each other (e.g., to enable a virtual computer system of the virtual computer system service 1008 to store data in or retrieve data from the on-demand data storage service 1014 and/or to access one or more block-level data storage devices provided by the block level data storage service 1010).

The virtual computer system service 1008 may be a collection of computing resources configured to instantiate virtual machine instances on behalf of the customer 1004. The customer 1004 may interact with the virtual computer system service 1008 (via appropriately configured and authenticated API calls) to provision and operate virtual computer systems that are instantiated on physical computing devices hosted and operated by the computing resource service provider 1002. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 1008 is shown in FIG. 10, any other computer system or computer system service may be utilized in the computing resource service provider 1002, such as a computer system or computer system service that does not employ virtualization or instantiation and instead provisions computing resources on dedicated or shared computers/servers and/or other physical devices.

The block-level data storage service 1010 may comprise one or more computing resources that collectively operate to store data for a customer 1004 using block-level storage devices (and/or virtualizations thereof). The block-level storage devices of the block-level data storage service 1010 may, for instance, be operationally attached to virtual computer systems provided by the virtual computer system service 1008 to serve as logical units (e.g., virtual drives) for the computer systems. A block-level storage device may enable the persistent storage of data used/generated by a corresponding virtual computer system where the virtual computer system service 1008 may only provide ephemeral data storage.

The computing resource service provider 1002 also includes a cryptography service 1012. The cryptography service 1012 may utilize one or more storage services of the computing resource service provider 1002 to store keys of the customers in encrypted form, whereby the keys may be usable to decrypt customer 1004 keys accessible only to particular devices of the cryptography service 1012.

The computing resource service provider 1002 further includes an on-demand data storage service 1014. The on-demand data storage service 1014 may be a collection of computing resources configured to synchronously process requests to store and/or access data. The on-demand data storage service 1014 may operate using computing resources (e.g., databases) that enable the on-demand data storage service 1014 to locate and retrieve data quickly, so as to allow data to be provided in responses to requests for the data. For example, the on-demand data storage service 1014 may maintain stored data in a manner such that, when a request for a data object is retrieved, the data object can be provided (or streaming of the data object can be initiated) in a response to the request. As noted, data stored in the on-demand data storage service 1014 may be organized into data objects. The data objects may have arbitrary sizes except, perhaps, for certain constraints on size. Thus, the on-demand data storage service 1014 may store numerous data objects of varying sizes. The on-demand data storage service 1014 may operate as a key value store that associates data objects with identifiers of the data objects which may be used by the customer 1004 to retrieve or perform other operations in connection with the data objects stored by the on-demand data storage service 1014.

In the environment illustrated in FIG. 10, a notification service 1016 is included. The notification service 1016 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 1016 may provide notifications to clients using a "push" mechanism without the need to periodically check or "poll" for new information and updates. The notification service 1016 may further be used for various purposes such as monitoring applications executing in the virtual computer system service 1008, workflow systems, time-sensitive information updates, mobile applications, and many others.

As illustrated in FIG. 10, the computing resource service provider 1002, in various embodiments, includes an authentication system 1018 and a policy management service 1020. The authentication system 1018, in an embodiment, is a computer system (i.e., collection of computing resources) configured to perform operations involved in authentication of users of the customer. For instance, one of the services 1008-16 and 1020-24 may provide information from a user to the authentication system 1018 to receive information in return that indicates whether or not the user requests are authentic.

The policy management service 1020, in an embodiment, is a computer system configured to manage policies on behalf of customers (such as customer 1004) of the computing resource service provider 1002. The policy management service 1020 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 1002, in various embodiments, is also equipped with a task service 1022. The task service 1022 is configured to receive a task package from the customer 1004 and enable executing tasks as dictated by the task package. The task service 1022 may be configured to use any resource of the computing resource service provider 1002, such as one or more instantiated virtual machines or virtual hosts, for executing the task. The task service 1024 may configure the one or more instantiated virtual machines or virtual hosts to operate using a selected operating system and/or a selected execution application in accordance with a requirement of the customer 1004.

The computing resource service provider 1002 additionally maintains one or more other services 1024 based at least in part on the needs of its customers 1004. For instance, the computing resource service provider 1002 may maintain a database service for its customers 1004. A database service may be a collection of computing resources that collectively operate to run one or more databases for one or more customers 1004. The customer 1004 may operate and manage a database from the database service by utilizing appropriately configured API calls. This, in turn, may allow a customer 1004 to maintain and potentially scale the operations in the database. Other services include, but are not limited to, object-level archival data storage services, services that manage and/or monitor other services.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 11:
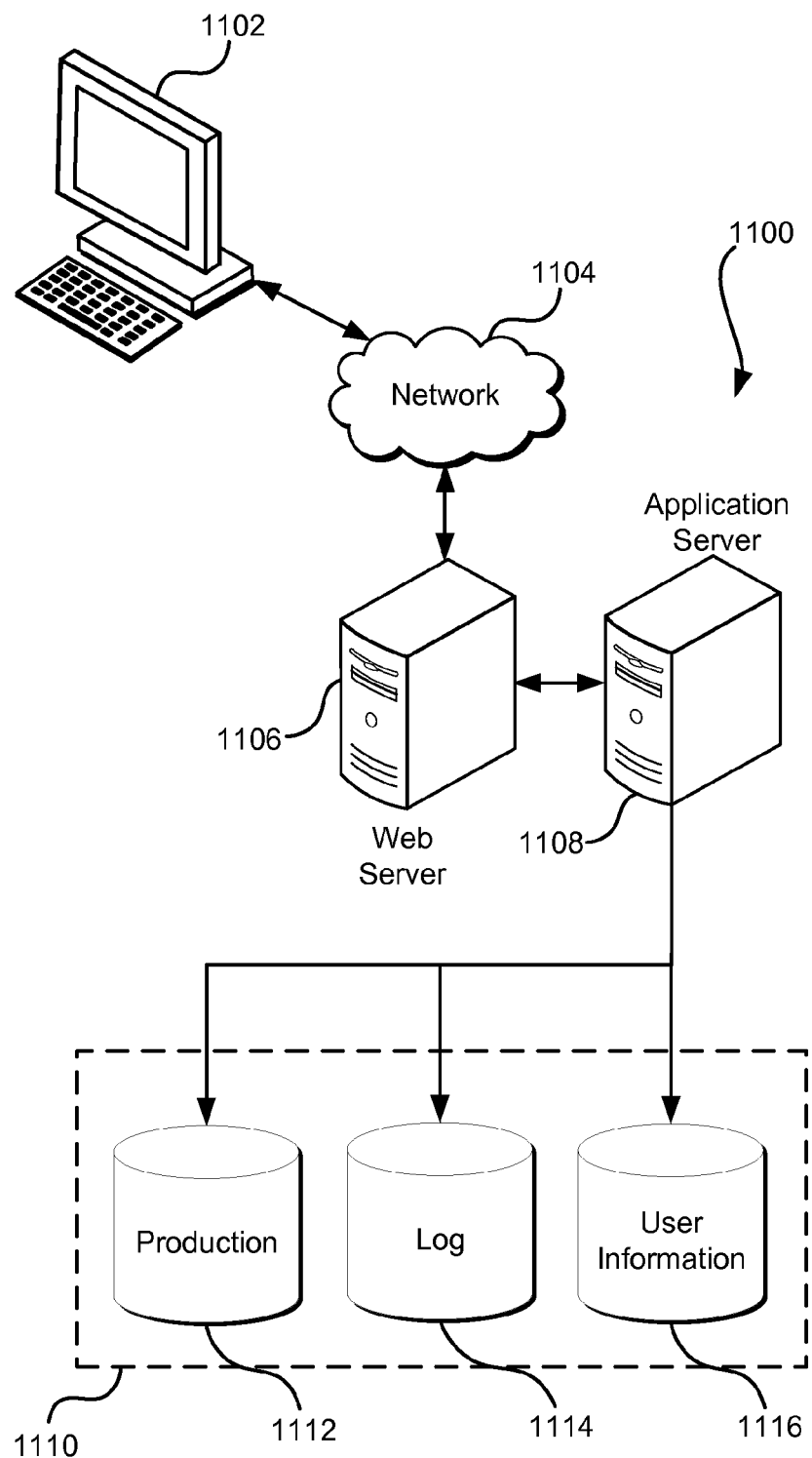
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   one or more processors;
   memory including instructions that, when executed by the one or more processors, cause the system to:
   receive a set of web service application programming interface calls that specifies a function and an execution instance for evaluating the function;
   configure the execution instance to evaluate the function;
   provide a cryptographically verifiable attestation of the function;
   receive, from each party of a plurality of parties, a respective input value, thereby resulting in a plurality of input values for the function;
   cause the execution instance to evaluate the function based at least in part on the plurality of input values, thereby generating an output of the function; and provide the output of the function without revealing any of the plurality of input values for the function.

2. The system of claim 1, wherein the execution instance corresponds to one or more secure execution environments instantiated on one or more host computer systems, wherein the secure execution environments are operable to compute the function.

3. The system of claim 1, wherein the memory further includes instructions that cause the system to cause at least one respective input value of the plurality of input values to become inaccessible.

4. The system of claim 1, wherein the set includes a web service application programming interface call whose fulfillment involves adding a function definition to a library of functions of a computing resource service provider.

5. A computer-implemented method, comprising:
under the control of one or more computer systems that execute instructions,
determining a function for use in multi-party computation service provided by a computing resource service provider;
configuring an execution instance to evaluate the function, the execution instance comprising a set of execution environments each with code for at least partial evaluation of the function;
providing, from the execution instance, an attestation of the function, the attestation comprising a cryptographic hash usable at least in part to validate integrity of the function;
evaluating, via the execution instance, a plurality of input values to determine an output, the plurality of inputs comprising a first input from a first party and a second input from a second party; and
providing the output determined.

6. The computer-implemented method of claim 5, wherein evaluating the plurality of input values to determine an output and providing the determined output comprises:
evaluating the function using a first set of input values to determine a first output;
providing the first output;
evaluating the function using a second set of input values to determine a second output; and
providing the second output.

7. The computer-implemented method of claim 5, wherein the method further comprises causing the plurality of input values to become inaccessible by terminating the one or more execution environments.

8. The computer-implemented method of claim 5, wherein determining a function includes receiving an application programming interface call with information that defines the function.

9. The computer-implemented method of claim 5, wherein the output further comprises an attestation that the plurality of input values have been made inaccessible.

10. The computer-implemented method of claim 5, wherein the method further comprises:
receiving an application programming interface call that defines a set of parameters for the execution instance; and
configuring the execution instance in accordance with the set of parameters.

11. The computer-implemented method of claim 5, wherein:
each execution environment of the set of execution environments is a hardware-protected execution environment; and each input of the plurality of inputs is encrypted so as to be decryptable by a respective hardware-protected execution environment using a key unavailable outside of the respective hardware-protected execution environment.

12. The computer-implemented method of claim 5, wherein:
the one or more execution environments comprise a first hardware-protected execution environment and a second hardware-protected execution environment;
the plurality of input values comprises a first set of input values and a second set of input values;
the function is a composite of at least a first function and a second function;
evaluating the function comprises:
evaluating the first function in the first hardware-protected execution environment using the first set of input values to generate a first result; and
evaluating the second function in the second hardware-protected execution environment using the second set of input values to generate a second result; and
providing the output based at least in part on the result comprises providing the output based at least in part on the first result and the second result.

13. The computer-implemented method of claim 5, wherein the plurality of input values comprise data from a data store and the function comprises one or more functions from a library that have been certified as usable to evaluate the data.

14. A non-transitory computer-readable storage medium having stored thereon executable instructions that, as a result of execution by one or more processors of a computer system, cause the computer system to at least:
receive, through a service of a provider, a request specifying a function for a multi-party computation;
provide an attestation of the function, the attestation comprising a cryptographic hash usable at least in part to validate integrity of the function;
obtain a plurality of input values, the plurality of input values comprising a first input value from a first party and a second input value from a second party, wherein the system prevents the first party from accessing the second input value and prevents the second party from accessing the first input value;
determine a result of the function based at least in part on the plurality of input values;
cause the plurality of input values to become inaccessible; and
provide the result of the function.

15. The non-transitory computer-readable storage medium of claim 14, wherein the instructions that cause the computer system to receive the request specifying the function, further include executable instructions that cause the computer system to provide an application programming interface for selecting the function from a library of functions provided by the provider.

16. The non-transitory computer-readable storage medium of claim 14, wherein the instructions that cause the computer system to receive the request specifying the function, further include executable instructions that cause the computer system to provide an application programming interface for receiving a function definition from a party of the one or more parties of the multi-party computation.

17. The non-transitory computer-readable storage medium of claim 14, wherein the service is configurable to accept input values only from corresponding authorized parties, and an execution of the function is configurable to specify that:
the first party is authorized to provide the first input value of the plurality of input values; and
the second party is authorized to provide the second input value of the plurality of input values.

18. The non-transitory computer-readable storage medium of claim 14, wherein the instructions that cause the computer system to provide the result of the function, further include instructions that cause the computer system to certify that the result was computed from input values provided by the first party and the second party.

19. The non-transitory computer-readable storage medium of claim 14, wherein the instructions that cause the computer system to provide the attestation of the function, further include instructions, that cause the computer system to provide, to the first party or the second party, a cryptographic key for encrypting at least one of the plurality of input values.

20. The non-transitory computer-readable storage medium of claim 14, wherein the instructions that cause the computer system to provide the result of the function, further include instructions that cause the computer system to provide the result only to parties of the multi-party computation.

21. The non-transitory computer-readable storage medium of claim 14, wherein:
the instructions that cause the computer system to provide the result of the function, further include instructions that cause the computer system to provide the result to at least one party other than the first party, the second party, or the provider; and
the at least one party is authorized by the first party and the second party to receive the result.

22. The non-transitory computer-readable storage medium of claim 14, wherein the instructions that cause the computer system to provide the result of the function, further include instructions cause the computer system to:
receive from the first party or the second party, a cryptographic key for encrypting the result of the function; and
provide, encrypted with the cryptographic key, the result of the function.

23. The non-transitory computer-readable storage medium of claim 14, wherein the instructions further include instructions that cause the computer system to update an accounting record corresponding to the first party or the second party based at least in part on the request specifying the function for the multi-party computation.

* * * * *